United States Patent
Maekawa et al.

(10) Patent No.: US 6,865,047 B2
(45) Date of Patent: Mar. 8, 2005

(54) SINGLE REEL TAPE CARTRIDGE AND RECORDING AND REPRODUCING DEVICE USING THE TAPE CARTRIDGE

(75) Inventors: Katsumi Maekawa, Tokyo (JP); Toshiya Kurokawa, Kanagawa (JP); Yasuaki Kano, Kanagawa (JP); Atsushi Mitani, Tokyo (JP); Yoshitsugu Taki, Kanagawa (JP); Motoyoshi Fujimori, Chiba (JP)

(73) Assignee: Sony Corporation, Tokyo (JP)

( * ) Notice: Subject to any disclaimer, the term of this patent is extended or adjusted under 35 U.S.C. 154(b) by 132 days.

(21) Appl. No.: 10/169,358
(22) PCT Filed: Nov. 2, 2001
(86) PCT No.: PCT/JP01/09648
    § 371 (c)(1),
    (2), (4) Date: Oct. 29, 2002
(87) PCT Pub. No.: WO02/37497
    PCT Pub. Date: May 10, 2002

(65) Prior Publication Data
US 2003/0089809 A1 May 15, 2003

(51) Int. Cl.[7] .............................................. G11B 15/18
(52) U.S. Cl. ........................................................ 360/69
(58) Field of Search .............................. 360/69, 85, 95, 360/128, 93, 132; 369/221; 242/332.4, 332.7, 348.2, 332.8, 363.04, 347, 348

(56) References Cited

U.S. PATENT DOCUMENTS

| 4,356,560 | A | * | 10/1982 | Ohnishi | 369/221 |
|---|---|---|---|---|---|
| 4,426,047 | A | * | 1/1984 | Richard et al. | 242/332.4 |
| 4,879,614 | A | * | 11/1989 | Nakagome | 360/93 |
| 5,046,168 | A | * | 9/1991 | Ohsaki | 242/332.4 |
| 5,128,815 | A | * | 7/1992 | Leonhardt et al. | 360/85 |
| 5,202,809 | A | * | 4/1993 | Dodt et al. | 360/132 |
| 5,333,810 | A | * | 8/1994 | Hoge et al. | 242/332.4 |
| 5,431,356 | A | * | 7/1995 | Horstman et al. | 242/348.2 |
| 5,479,021 | A | * | 12/1995 | Morgan et al. | 250/363.04 |
| 5,542,620 | A | * | 8/1996 | Ohshita | 242/332.4 |
| 5,906,324 | A | * | 5/1999 | Adams et al. | 242/332.8 |
| 5,979,813 | A | * | 11/1999 | Mansbridge et al. | 242/332.4 |
| 6,043,963 | A | * | 3/2000 | Eaton | 360/163 |
| 6,050,514 | A | * | 4/2000 | Mansbridge | 242/332.7 |
| 6,067,212 | A | * | 5/2000 | Poorman | 360/128 |
| 6,166,881 | A | * | 12/2000 | Anderson et al. | 360/128 |
| 6,437,938 | B1 | * | 8/2002 | Wada | 360/95 |
| 6,452,745 | B1 | * | 9/2002 | Shiga et al. | 360/132 |
| 6,452,748 | B1 | * | 9/2002 | Shima et al. | 360/132 |
| 6,471,150 | B1 | * | 10/2002 | Tsuchiya et al. | 242/332.4 |
| 6,577,467 | B2 | * | 6/2003 | Hoge et al. | 360/85 |

* cited by examiner

Primary Examiner—Sinh Tran
Assistant Examiner—Fred F. Tzeng
(74) Attorney, Agent, or Firm—Jay H. Maioli

(57) ABSTRACT

A single-reel tape cartridge includes a leader block and a take-up reel disposed inside a drive apparatus that are provided with retaining members so that the leader block is firmly positioned and rattling thereof is prevented. A pair of changer grips which extend from end to end of a housing of the cartridge in the vertical direction are formed at two corners of the cartridge housing. In addition, a memory module, which stores the management information for the tape-like recording medium and which is used for radio communication, is disposed at an angle in one of the corners of the cartridge so that a communication antenna of the memory module faces at least two directions. In addition, the leader tape is provided with a striped portion used for identifying the medium, and the cartridge housing is closed by a shutter used for disengaging the reel lock.

15 Claims, 29 Drawing Sheets

SINGLE REEL TAPE CARTRIDGE AND RECORDING AND REPRODUCING DEVICE USING THE TAPE CARTRIDGE

TECHNICAL FIELD

The present invention relates to single-reel tape cartridges suitable for use in magnetic recording/playback apparatuses such as tape streamers, and belongs to a technical field relating to automatic cartridge exchange. More specifically, the present invention relates to a leader block which becomes engaged with a tape-extracting mechanism, changer grips used for automatic cartridge exchange, a memory module which manages information related to recording media, a leader tape having a striped portion used for identifying a recording medium, and a reel-lock which prevents a tape reel from rotating freely.

BACKGROUND OF THE INVENTION

Single-reel tape cartridges used for backing up computers are known in the art.

Single-reel tape cartridges are constructed by installing a tape reel having a large diameter in an approximately rectangular cartridge housing in a rotatable manner, and winding a tape-like recording medium around the tape reel, the inner end of the tape-like recording medium being attached to the periphery of the tape reel. The outer end of the tape-like recording medium is extracted through a tape-passage hole formed at the front side of cartridge housing at one end thereof and is wound around the periphery of a take-up reel. A central region of the extracted tape-like recording medium is loaded around a rotating head drum, and sound data and image data are recorded on the tape-like recording medium by the rotating head drum while the tape-like recording medium is being wound around the take-up reel.

When a single-reel tape cartridge is loaded in a recording/playback apparatus, a tape-like recording medium contained in the cartridge must be lead out and wound around a take-up reel located in the recording/playback apparatus. To achieve this, the tape-like recording medium is attached to a leader block, which is pulled out by a tape-extracting mechanism and transferred by a transferring mechanism.

When the leader block is disposed inside a cartridge housing, it is placed inside a leader block receiver, which is large enough to store the leader block. The leader block receiver is formed at a position close to an opening formed in the cartridge housing, and the opening is closed while the leader block is placed inside the leader block receiver.

In addition, when the leader block is disposed inside the take-up reel, it is placed inside a leader block retainer, which is formed in a reel hub of the take-up reel in such a manner that the leader block can be inserted therein. The leader block retainer is formed by cutting out parts of flanges and the reel hub of the take-up reel toward the center, and the leader block transferred by the transferring mechanism of the recording/playback apparatus is inserted in the leader block retainer. The leader block retainer is provided with an open end having a large width through which the leader block is inserted.

On the other hand, the applicant of the present invention has applied a patent for a library apparatus disclosed in Japanese Unexamined Patent Application Publication No. 2000-57662. The library apparatus disclosed in this publication uses double-reel tape cartridges such as Advanced Intelligent Tape (AIT) cartridges and Digital Video (DV) cartridges. Each of the double-reel tape cartridges is provided with a pair of changer grips at the right and left sides thereof at positions closer to the rear side than to the front side. The changer grips are formed as concavities having a trapezoidal shape.

In addition, a pair of opening/closing hand arms are mounted on a tray used for transferring the tape cartridges. The opening/closing hand arms are able to clamp each of the tape cartridges stored in a magazine by the changer grips and carry it between the magazine and the tray and between the tray and a magnetic recording/playback apparatus. Accordingly, the tape cartridges are exchanged automatically.

However, since single-reel tape cartridges of the known art are not provided with changer grips, they require complex transfer mechanism when used in library apparatuses in which tape cartridges are exchanged automatically.

On the other hand, some double-reel tape cartridges (for example, AIT cartridges and DV cartridges used in tape streamers) contain a memory module at the rear side thereof, that is, at the side opposite to the front side in which a tape-passage hole, which is opened and closed by a front lid, is formed. The memory module stores management information of a tape-like recording medium which serves as a recording medium.

A tape cartridge of this type is inserted horizontally through a cartridge-receiving hole formed in a front panel of a magnetic recording/playback apparatus from the side at which the front lid is formed. Then, the tape cartridge is horizontally drawn into the magnetic recording/playback apparatus by a cassette compartment, moved vertically downward, and loaded by being engaged with a pair of reel shafts from the upper side thereof.

When the tape cartridge is loaded, the memory module mounted at the rear side of the tape cartridge is placed in front of a memory-access module, which is mounted inside the front panel of the magnetic recording/playback apparatus at a position below the cartridge-receiving hole.

Then, the tape-like recording medium contained in the tape cartridge is extracted through the tape-passage hole formed at the front side of the tape cartridge and is loaded around the periphery of a rotating head drum by a tape-loading mechanism. In addition, the management information for the tape-like recording medium stored in the memory module is read out by the memory-access module by an accessing method similar to that of a barcode reader, etc. Then, an information recording and/or playback operation is performed on the basis of the management information obtained as described above.

On the other hand, a plurality of kinds of tape cartridges containing tapes with different storage capacities and storage characteristics have been provided, and they are distinguished from each other by forming identification holes in cartridge housings.

However, in tape cartridges containing a single tape reel, the beginning of tape (BOT) and the end of tape (EOT) cannot be detected from the tape-like recording media themselves. More specifically, the tape-like recording media are formed uniformly from the beginning to the end.

A tape cartridge containing a tape-like recording medium as described above includes a reel-lock which prevents the tape reel from rotating freely when the tape cartridge is not loaded in a drive apparatus.

In addition, a reel lock disengaging member is disposed inside the drive apparatus, and a reel lock disengaging member receiving groove, in which the reel lock disengaging member is inserted, is formed in the cartridge housing at one of the side surfaces which are parallel to the direction in which the cartridge is inserted into the drive apparatus. The reel lock disengaging member receiving groove extends from the front end in the direction in which the cartridge is inserted into the drive apparatus toward the other.

The reel lock disengaging member receiving groove is formed by cutting out a part of the cartridge housing at one of the side surfaces thereof so as to form a groove which has a bracket shape in cross-section and which is open at the front end in the direction in which the cartridge is inserted into the drive apparatus and extends toward the other end. The reel lock, which is disposed inside the cartridge housing and prevents the tape reel from rotating freely, faces toward the outside through the reel lock disengaging member receiving groove.

When the tape cartridge is inserted into the drive apparatus, the reel lock disengaging member, which is disposed inside the drive apparatus, is inserted through the reel lock disengaging member receiving groove and contacts the reel lock.

The tape reel, which is rotatably installed in a tape reel receiver, includes a reel hub and upper and lower flanges formed at the upper and lower ends of the reel hub. The tape-like recording medium is wound around the reel hub while one end thereof is attached to the reel hub, and windings of the tape are aligned by the upper and lower flanges.

Engaging teeth, which become engaged with the reel lock, are formed around the entire periphery of the upper flange.

The reel lock, which prevents the tape reel from rotating freely by becoming engaged with the engaging teeth, includes a locking member having a restraining projection which becomes engaged with the engaging teeth. The locking member is constantly pressed toward the tape reel by a torsion spring or the like, and restrains the rotation of the tape reel by becoming engaged with the engaging teeth formed on the upper flange.

The locking member faces toward the outside through the reel lock disengaging member receiving groove, and when the tape cartridge is inserted into the drive apparatus, the reel lock disengaging member disposed inside the drive apparatus is inserted through the reel lock disengaging member receiving groove and contacts the locking member.

When the reel lock disengaging member contacts the reel lock, the reel lock is pressed in a direction in which the reel lock becomes disengaged from the tape reel. Accordingly, when the tape cartridge is inserted in the drive apparatus, the tape reel becomes free to rotate, so that the tape-like recording medium can be transferred to the take-up reel.

When the tape cartridge is ejected from the drive apparatus, the reel lock disengaging member is removed from the reel lock disengaging member receiving groove, so that the reel lock is moved toward the tape reel by the pressing force applied by the torsion spring. Accordingly, the reel lock becomes engaged with the engaging teeth formed on the upper flange and restrains the rotation of the tape reel.

Accordingly, the reel lock prevents the tape reel from rotating freely inside the cartridge housing when the tape cartridge is not used.

The leader block retainer and the leader block receiver formed in the take-up reel and the leader block receiver, respectively, must be constructed such that the leader block can be inserted and extracted. Accordingly, when the leader block is disposed in the leader block retainer, a predetermined amount of clearance is provided between the leader block and the leader block receiver and between the leader block and the leader block retainer.

Accordingly, the leader block cannot be reliably positioned inside the take-up reel and the cartridge housing, and rattling easily occurs.

In addition, the pair of changer grips formed in AIT cartridges, DV cartridges, etc., of the known art are constructed as concavities having a trapezoidal shape and do not extend from end to end in the vertical direction. Accordingly, the pair of opening/closing hand arms mounted on the tray must perform an opening/closing operation to clamp the cartridge by the changer grips.

Accordingly, the opening/closing hand arms must perform both a sliding operation for transferring the tape cartridge between the magazine and the tray and between the tray and the magnetic recording/playback apparatus and the opening/closing operation for clamping the tape cartridge. Therefore, there is a problem in that the mechanism and control processes of the opening/closing hand arms are extremely complex and high costs are thereby incurred.

In addition, when the memory module is disposed at the rear side of the tape cartridge, the direction from which the memory-access module is able to access the memory module is limited to the rear side of the tape cartridge. Accordingly, the position at which the memory-access module can be placed inside the magnetic recording/playback apparatus is limited to the area between the rear surface of the tape cartridge loaded in the magnetic recording/playback apparatus and the inside surface of the front panel. Therefore, the depth of the magnetic recording/playback apparatus, that is, the size thereof in the front-rear direction, is increased.

Furthermore, there is a problem in that when the magnetic recording/playback apparatus is of the type in which the rear side of the tape cartridge projects outside while the tape cartridge is loaded in the magnetic recording/playback apparatus, the memory module cannot be accessed by the memory-access module.

In addition, as described above, in tape cartridges containing a single tape reel, the beginning of tape (BOT) and the end of tape (EOT) cannot be detected from the tape-like recording media themselves. More specifically, the tape-like recording media are formed uniformly from the beginning to the end.

In addition, since the end of the tape-like recording medium is merely wound around the hub of the tape reel in such a tape cartridge, when the tape-like recording medium is extracted by more than a predetermined length, the end of the tape-like recording medium becomes separated from the tape reel and is pulled out from the cartridge.

When the end of the tape-like recording medium is pulled out from the cartridge, the tape-like recording medium becomes entirely wound around the take-up reel in the magnetic recording/playback apparatus, so that it becomes extremely difficult to take the tape-like recording medium out from the magnetic recording/playback apparatus. In addition, that tape-like recording medium probably cannot be used afterwards.

In order to avoid this, the operation of extracting the tape-like recording medium must be stopped while the tape-like recording medium is still wound around the tape reel at a sufficient length. Accordingly, the tape-like recording medium cannot be fully utilized as a data region to the end.

In addition, in the case in which the identification holes are formed in the cartridge housing in order to identify the kind thereof, positions at which the identification holes can be formed are limited, so that there is a limit to the number of kinds which can be represented by the identification holes. Accordingly, parameters of electrical characteristics and parameters used for mechanical control are not always suitable for that tape, and tape-like recording media formed of similar materials are classified into the same group.

Accordingly, the recording/playback system cannot be controlled with optimum parameters, so that tape-like recording media cannot be used at their best performances.

In addition, when tape cartridges which do not contain memories storing management information are used, tape streamer drives require information such as the tape length, the tape thickness, etc., in order to handle the tape cartridges (to manage the remaining capacity, to control the drive, etc.).

When an unformatted (blank) tape is used, it is necessary to run the tape-like recording medium at an original speed, measure the reel diameter, and calculate the tape length on the basis of the reel diameter. Accordingly, a long time is required for loading the tape-like recording medium, and the tape thickness must be determined in advance.

In the case in which a tape cartridge containing a formatted tape is used, information obtained in advance by performing measurement is recorded in a system area of the tape-like recording medium when the tape is formatted. The drive obtains the information, such as the tape length and the tape thickness, by reading the system area of the tape-like recording medium.

However, in this case, the drive must determine parameters suitable for the electrical characteristics of the tape by trial-and-error in order to read the system area of the tape-like recording medium. Accordingly, the tape-streamer drive of the known art has a problem in that a long time is required for loading the tape.

In addition, in the tape cartridge of the known art, the reel lock, which becomes disengaged from the tape reel when the tape reel is to be released, must face toward the outside through the reel lock disengaging member receiving groove.

Accordingly, not only when the cartridge is inside the drive apparatus but also when it is ejected therefrom, the interior of the cartridge housing always faces toward the outside through the reel lock disengaging member receiving groove.

Therefore, there is a risk in that dust will enter the cartridge housing and damage the tape-like recording medium so that the recording/playback characteristics of the tape-like recording medium are degraded.

In addition, when the tape cartridge is inserted in the drive apparatus, it may be inserted inversely by accident. In such a case, there is a risk in that a cartridge holder in the drive apparatus will be damaged or malfunction of the drive apparatus will occur.

DISCLOSURE OF INVENTION

An object of the present invention is to provide an excellent single reel cartridge and a recording/playback apparatus with which the above-described problems do not occur. The present invention provides a tape cartridge and a recording/playback apparatus in which a leader block is reliably positioned in a take-up reel and in a cartridge housing, and rattling of the leader block is prevented.

In addition, according to the present invention, a single-reel tape cartridge is used in a library apparatus in which the tape cartridge can be transferred between a magazine and a tray and between the tray and a magnetic recording/playback apparatus with a simple mechanism.

In addition, the present invention provides an information-storing cartridge and a recording/playback apparatus in which a memory module used for radio communication is installed in a single-reel tape cartridge, the memory module being accessible from at least two directions.

In addition, the present invention provides a tape cartridge and a recording/playback apparatus in which the kind of a tape-like recording medium is identified without degrading the compatibility with a known tape streamer drive so that parameters necessary for the recording/playback operation are set in accordance with the kind of the tape-like recording medium, and in which the end of the tape-like recording medium can be reliably detected.

In addition, the present invention provides a tape cartridge and a recording/playback apparatus in which a reel lock disengaging member receiving groove is provided with a shutter so that dust is prevented from entering and in which the tape cartridge is prevented from being inserted improperly.

According to the present invention, a tape cartridge includes a leader block connected to one end of a tape-like recording medium, a tape reel around which the tape-like recording medium connected to the leader block is wound, and a cartridge housing which contains the tape reel in a rotatable manner and which is provided with an opening through which a part of the leader block faces toward the outside. The leader block is provided with one of a positioning groove and a positioning projection used for guiding and positioning the leader block when the leader block is inserted into a take-up reel which winds the tape-like recording medium, and one of a restraining recess and a restraining projection used for positioning the leader block in the take-up reel.

In addition, the leader block may further be provided with one of a second positioning groove and a second positioning projection used for guiding and positioning the leader block when the leader block is inserted into the cartridge housing, and one of a second restraining recess and a second restraining projection used for positioning the leader block in the cartridge housing, and the opening formed in the cartridge housing may be provided with one of a positioning projection and a positioning groove which becomes engaged with one of the second positioning groove and the second positioning projection provided in the leader block so as to guide and position the leader block when the leader block is inserted into the cartridge housing, and one of a restraining projection and a restraining recess which becomes engaged with one of the second restraining recess and the second restraining projection provided in the leader block so as to position the leader block in the cartridge housing.

In addition, according to the present invention, a recording/playback apparatus includes a cartridge-receiving member in which the tape cartridge, which contains a tape-like recording medium connected to the leader block at one end thereof, is installed, a tape-extracting member having an engaging shaft which becomes engaged with an engaging. member of a leader block attached to the end of the tape-like recording medium, a take-up mechanism which winds the tape-like recording medium extracted by the tape-extracting member, and a transferring mechanism which transfers the tape-extracting member between the tape cartridge installed in the cartridge-receiving member and the take-up mechanism. The take-up mechanism is provided with one of a positioning projection and a positioning groove which becomes engaged with one of a positioning groove and a positioning projection provided in the leader block so as to guide and position the leader block when the leader block is inserted into the take-up mechanism, and one of a restraining projection and a restraining recess which becomes engaged with one of a restraining recess and a restraining projection provided in the leader block so as to position the leader block in the take-up mechanism.

In addition, in order to attain the above-described objects, the single-reel tape cartridge of the present invention may include a pair of changer grips which extend from end to end of the cartridge housing in the vertical direction at two corners selected from three corners of the cartridge housing excluding a corner at which the tape-passage hole is formed.

In the single-reel tape cartridge of the present invention which is constructed as described above, since the changer grips which extend from end to end of the cartridge housing in the vertical direction are formed at two corners selected from three corners of the cartridge housing excluding a corner at which the tape-passage hole is formed, if the single-reel tape cartridge used in a library apparatus or the like, it can be carried between a magazine and a tray used for transferring the tape cartridge and between the tray and a magnetic recording/playback apparatus even when hand arms mounted on the tray do not have opening/closing function.

In addition, in the single-reel tape cartridge of the present invention, a memory module, which stores management information for the recording medium and which is used for radio communication, may be installed in the cartridge housing in such a manner that a radio-communication antenna thereof faces at least two directions.

Since the memory module is installed in the cartridge housing in such a manner that the radio-communication antenna thereof faces at least two directions, the management information for the recording medium stored in the memory module can be accessed selectively from at least two directions.

In addition, according to the present invention, at least one of a first end of the tape-like recording medium placed near the center of the tape reel and a second end of the tape-like recording medium placed at the periphery of the tape reel may be provided with a leader tape portion and a striped portion used for identifying the medium, the tape-like recording medium being extracted from the cartridge housing from the second end thereof when the tape-like recording medium is subjected to an information signal recording/playback operation.

In addition, according to the present invention, the first end of the tape-like recording medium placed near the center of the tape reel may be fixed to the tape reel, the tape-like recording medium being extracted from the cartridge housing from the second end of the tape-like recording medium placed at the periphery of the tape reel when the tape-like recording medium is subjected to an information signal recording/playback operation.

In addition, according to the present invention, a recording/playback apparatus performs an information signal recording/playback operation by using a single-reel tape cartridge which contains a tape-like recording medium, at least one of a first end of the tape-like recording medium placed near the center of the tape reel and a second end of the tape-like recording medium placed at the periphery of the tape reel being provided with a leader tape portion and a striped portion used for identifying the medium, and the tape-like recording medium being extracted from the cartridge housing from the second end thereof when the tape-like recording medium is subjected to an information signal recording/playback operation. The recording/playback apparatus includes a leader tape portion detecting unit which detects the leader tape portion at the first end of the tape-like recording medium and a control unit which controls the operation of extracting the tape-like recording medium out from the cartridge housing, and the control unit stops the extraction of the tape-like recording medium from the cartridge housing when the leader tape portion at the first end of the tape-like recording medium is detected by the leader tape portion detecting unit.

In addition, according to the present invention, a recording/playback apparatus performs an information signal recording/playback operation by using a single-reel tape cartridge which contains a tape-like recording medium, at least one of a first end of the tape-like recording medium placed near the center of the tape reel and a second end of the tape-like recording medium placed at the periphery of the tape reel being provided with a leader tape portion and a striped portion used for identifying the medium, and the tape-like recording medium being extracted from the cartridge housing from the second end thereof when the tape-like recording medium is subjected to an information signal recording/playback operation. The recording/playback apparatus includes a striped-portion detecting unit which detects the striped portion formed on the leader tape portion at the second end of the tape-like recording medium and a control unit which identifies the tape cartridge, and the control unit identifies the tape cartridge on the basis of the detection result of the striped portion formed on the leader tape portion at the second end of the tape-like recording medium obtained by the striped-portion detecting unit.

In addition, according to the present invention, a recording/playback apparatus performs an information signal recording/playback operation by using a single-reel tape cartridge which contains a tape-like recording medium and a memory unit in which management information and medium identifying information for the tape-like recording medium is stored, at least one of a first end of the tape-like recording medium placed near the center of the tape reel and a second end of the tape-like recording medium placed at the periphery of the tape reel being provided with a leader tape portion and a striped portion used for identifying the medium, and the tape-like recording medium being extracted from the cartridge housing from the second end thereof when the tape-like recording medium is subjected to an information signal recording/playback operation. The recording/playback apparatus includes a striped-portion detecting unit which detects the striped portion formed on the leader tape portion at the second end of the tape-like recording medium, an information reading unit which reads information from the memory unit, and a control unit which identifies the tape cartridge, and the control unit identifies the tape cartridge on the basis of the medium identifying information read out from the memory unit by the information reading unit, and when the tape cartridge cannot be identified by the medium identifying information, identifies the tape cartridge on the basis of the detection result of the striped portion formed on the leader tape portion at the second end of the tape-like recording medium obtained by the striped-portion detecting unit.

In addition, according to the present invention, a recording/playback apparatus performs an information signal recording/playback operation by using a single-reel tape cartridge which contains a tape-like recording medium and a memory unit in which management information and medium identifying information is stored, at least one of a first end of the tape-like recording medium placed near the center of the tape reel and a second end of the tape-like recording medium placed at the periphery of the tape reel being provided with a leader tape portion and a striped portion used for identifying the medium, and the tape-like recording medium being extracted from the cartridge housing from the second end thereof when the tape-like recording medium is subjected to an information signal recording/playback operation. The recording/playback apparatus includes a striped-portion detecting unit which detects the striped portion formed on the leader tape portion at the second end of the tape-like recording medium, a medium-identifying-hole detecting unit which detects medium identifying holes formed in the cartridge housing, an information reading unit which reads information from the memory unit, and a control unit which identifies the tape cartridge, and the control unit identifies the tape cartridge on the basis of the medium identifying information read out from the memory unit by the information reading unit, and when the tape cartridge cannot be identified by the medium identifying information, identifies the tape cartridge on the basis of the detection result of the medium identifying holes obtained by the medium-identifying-hole detecting unit, and when the tape cartridge cannot be identified by the detection result of the medium identifying holes, identifies the tape cartridge on the basis of the detection result of the striped portion formed on the leader tape portion at the second end of the tape-like recording medium obtained by the striped-portion detecting unit.

In addition, a tape cartridge according to the present invention includes a tape reel which is contained in a cartridge housing in a rotatable manner, a reel lock which becomes engaged with an engaging-member of the flange and thereby prevents the tape reel, around which the tape-like recording medium is wound, from rotating, a reel lock disengaging member receiving groove which is formed at at least one side of the cartridge housing which is parallel to the direction in which the tape cartridge is inserted into a drive apparatus, which is open at the front side in the direction in which the tape cartridge is inserted into the drive apparatus, and which receives a reel lock disengaging member which disengages the reel lock from the flange, and a shutter which closes the reel lock disengaging member receiving groove, which is in contact with the reel lock, and which disengages the reel lock from the flange by being pressed by the reel lock disengaging member.

The reel lock disengaging member receiving groove may be formed at a position displaced from the center of the cartridge housing in the thickness direction thereof.

BEST MODE FOR CARRYING OUT THE INVENTION

Figure 1:
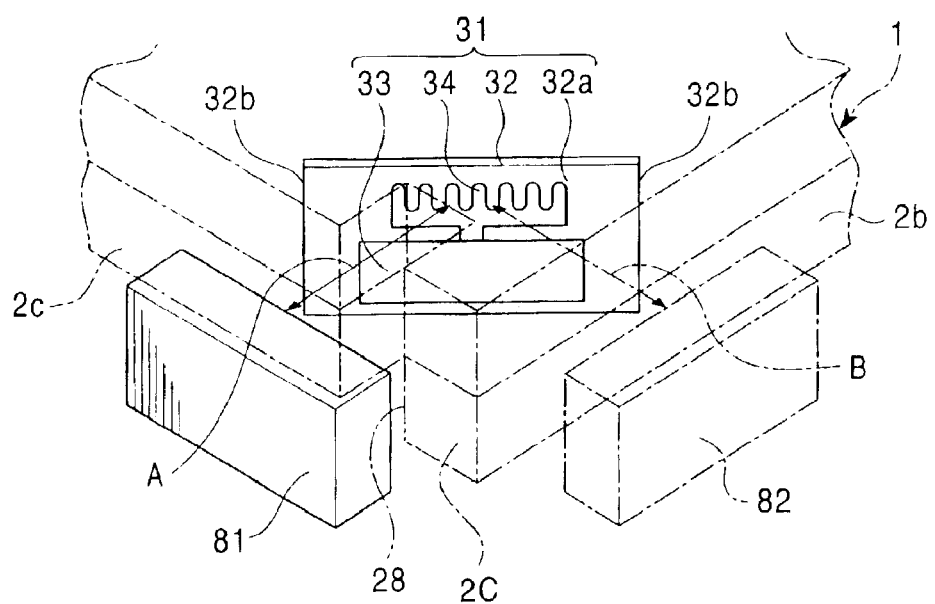
FIG. 1 is a perspective view showing a main part of an MIC according to a first embodiment, which is contained in a single-reel tape cartridge of the present invention.
Figure 2:
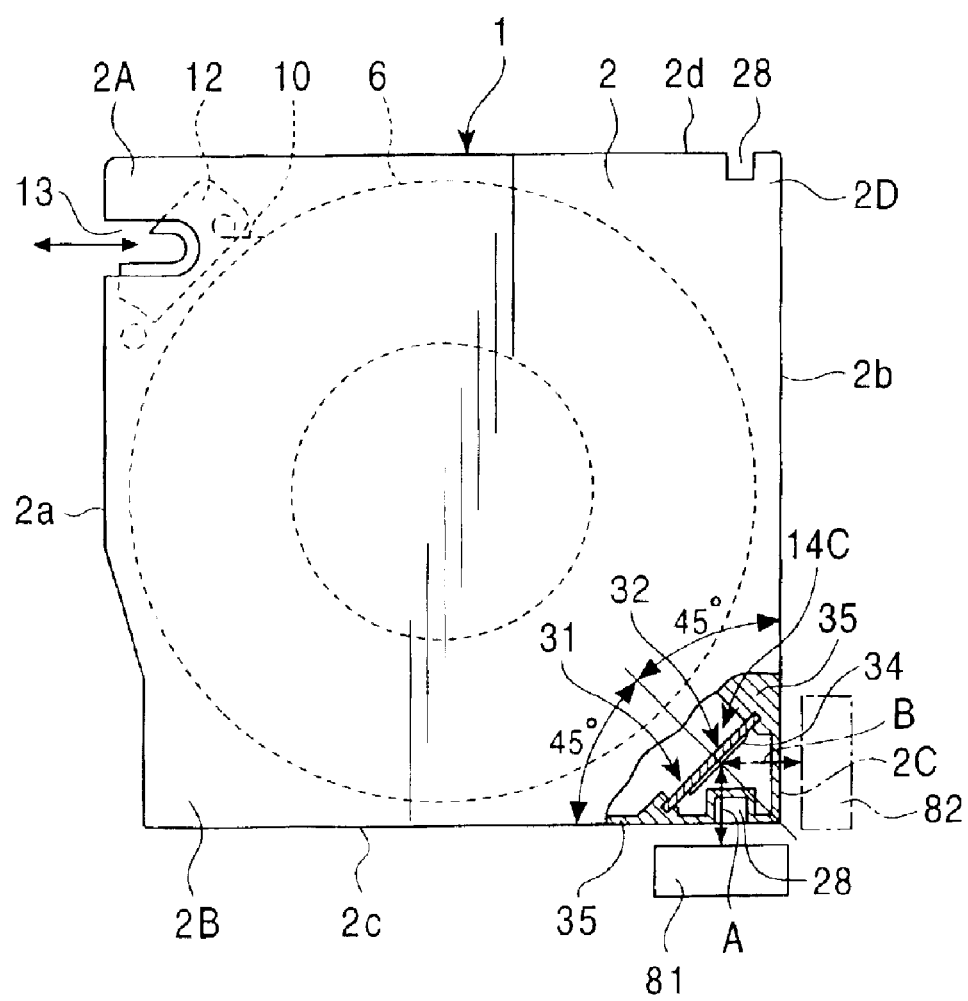
FIG. 2 is a partially broken plan view showing a position at which the MIC shown in FIG. 1 is mounted.

A single-reel tape cartridge, an information recording/playback apparatus, and an information recording/playback system according to the present invention will be described below with reference to the accompanying drawings, in the following order:

(1) General explanations of the single-reel tape cartridge and the magnetic recording/playback apparatus, (2) Explanations of changer grips formed in the single-reel tape cartridge and a cartridge changer, (3) Explanations of a memory module installed in the single-reel tape cartridge and memory-access modules of the magnetic recording/playback apparatus and the cartridge changer, (4) Explanations of a leader tape and a striped portion used for identifying recording media of the single-reel tape cartridge and the recording/playback apparatus, (5) Explanations of a leader block of the single-reel tape cartridge and the recording/playback apparatus, and (6) Explanations of a reel lock of the single-reel tape cartridge, a reel lock disengaging member, and the magnetic recording/playback apparatus.

(1) General Explanations of the Single-reel Tape Cartridge and the Magnetic Recording/playback Apparatus First, the single-reel tape cartridge and the information recording/playback apparatus will be described below with reference to FIGS. 5 to 11.

The present invention can be applied to various kinds of information storing cartridges using various kinds of recording media, for example, tape-like recording media including tape-like recording media, disc-type recording media including optical discs, etc. In the present embodiment, a single-reel tape cartridge using a tape-like recording medium and a magnetic recording/playback apparatus, such as a tape streamer, which serves as an information recording/playback apparatus for recording and/or playback information on the tape-like recording medium, will be described.

The overall construction of a single-reel tape cartridge (hereinafter referred to simply as a tape cartridge) 1 will be described below with reference to FIGS. 5 to 10. The tape cartridge 1 includes a cartridge housing 2 having a rectangular, flat shape constructed by combining an upper shell 3 and a lower shell 4 formed of a synthetic resin or the like. The upper and lower shells 3 and 4 have circular walls 5, and a tape reel 6 having a large diameter is rotatably disposed inside the circular walls 5, which are combined together. The tape reel 6 includes a hub 7 at the center and upper and lower flanges 8 and 9 at the upper and lower ends of the hub 7. A long tape-like recording medium 10 is wound around the periphery of the hub 7 between the upper and lower flanges 8 and 9, and the inner end of the tape-like recording medium 10 is attached to the periphery of the hub 7 by an inner leader tape (the leader tape will be described in detail in (4)).

The outer end 10a of the tape-like recording medium 10 is connected to a leader tape 11, which is connected to a leader block 12 formed of a synthetic resin or the like (the leader block will be described in detail in (5)).

The cartridge housing 2 is formed as a hexahedron having an anterior side 2a corresponding to a front side, a posterior side 2b corresponding to a rear side, a right side 2c and a left side 2d which are at the right and left, respectively, when the anterior side 2a is seen from the front, a top side 2e, and a bottom side 2f. Approximately right-angle corners 2A, 2B, 2C, and 2D are formed at the peripheral region of the cartridge housing 2, and triangular spaces 14A, 14B, 14C, and 14D are formed inside the four corners 2A, 2B, 2C, and 2D, respectively, and outside the circular walls 5.

The triangular space 14A at the corner 2A between the anterior side 2a and the left side 2d of the cartridge housing 2 is provided with a tape-passage hole 13, and the leader block 12 connected to the leader tape 11 is extracted through the tape-passage hole 13. In addition, a reel-shaft receiving hole 16 is formed in the lower shell 4 at the center thereof. In addition, a pair of positioning reference holes 17, a pair of positioning notches 18, a plurality of detection holes 19 used for identifying the kind of the tape-like recording medium 10, etc., are also formed in the lower shell 4.

In addition, a reel lock mechanism 21 is disposed in the triangular space 14B at the corner 2B between the anterior side 2a and the right side 2c of the cartridge housing 2. The reel lock mechanism 21 includes a peripheral gear 22 formed around the periphery of the upper flange 8 of the tape reel 6, a lock lever 23 which is rotatably attached on the lower shell 4 with a fulcrum shaft 23a and which becomes engaged and disengaged with the peripheral gear 22, a shutter 24 which is able to slide inside the cartridge 2 along the right side 2c in the front-rear direction and which rotates the lock lever 23 away from the peripheral gear 22, a pressing unit which presses the lock lever 23 in the direction in which the lock lever 23 becomes engaged (interlocked) with the peripheral gear 22, and a pressing unit which presses the shutter 24 in a direction in which the shutter 24 is shut.

Figure 5:
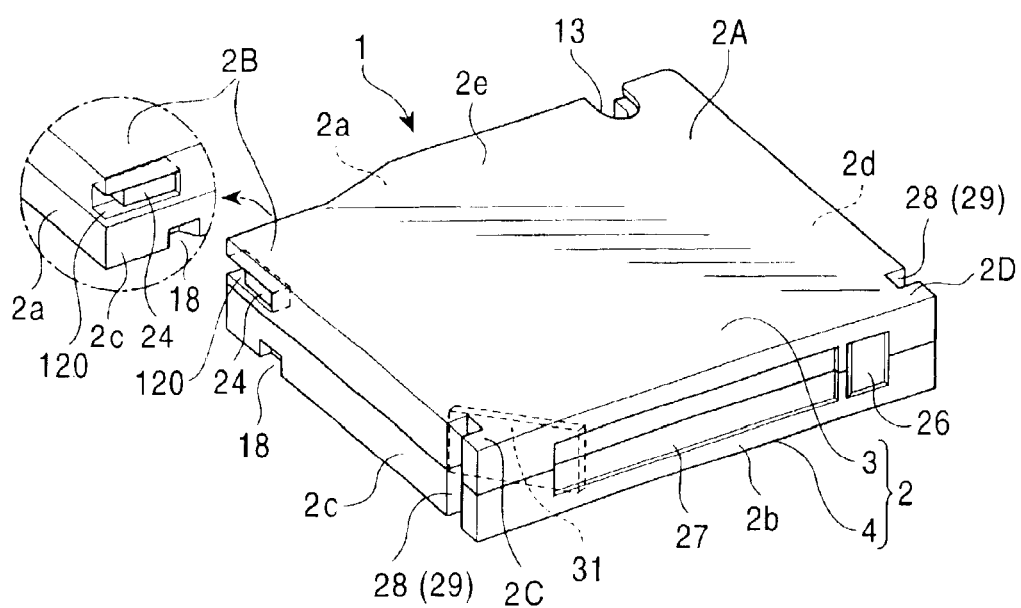
FIG. 5 is a perspective view of the tape cartridge as seen from the upper side.

As shown in FIG. 5, at the corner 2B of the cartridge housing 2, a slit-shaped shutter opening/closing groove 120 is formed horizontally in the right side 2c from the anterior side 2a toward the posterior side 2b, and the shutter 24 is disposed inside the shutter opening/closing groove 120 (The reel lock mechanism will be described in detail in (6)).

In addition, a write-protect switch 26 is disposed in the triangular space 14D at the corner 2D between the posterior side 2b and the left side 2d of the cartridge housing 2. The write-protect switch 26 is able to slide along the posterior side 2b in the right-left direction, and is positioned at either the right end or the left end in a slidable range thereof. In addition, a Memory In Cassette (MIC) 31, which serves as a non-contact memory module, is stored (mounted) at the corner 2C between the posterior side 2b and the right side 2c. The MIC 31 will be described in detail, in (3).

Next, a magnetic recording/playback apparatus 51, such as a tape streamer, which serves as an information recording/playback apparatus stored in a computer system or the like, will be described below with reference to FIG. 11. A cartridge-receiving hole 53 is formed in a front panel 52, and a cassette compartment 54 is disposed horizontally inside the front panel 52.

When the tape cartridge 1 is inserted horizontally from the anterior side 2a thereof through the cartridge-receiving hole 53 into the cassette compartment 54 in the direction shown by the arrow a, a cassette-drawing device (not shown) disposed inside the cartridge compartment 54 horizontally draws the tape cartridge 1 into the cassette compartment 54 in the direction shown by the arrow a. When the tape cartridge 1 is drawn into the cassette compartment 54, the tape reel 6 is released from the reel lock mechanism 21 located in the tape cartridge 1. Then, although not shown in the figure, the cassette compartment 54 is moved vertically downward from an upper position to a lower position. Accordingly, a reel shaft 56 extending upward on a mechanical deck 55 is inserted through the reel-shaft receiving hole 16 of the tape cartridge 1 into the hub 7 of the tape reel 6 contained in the tape cartridge 1, and becomes engaged with the hub 7. Then, the tape reel 6 rises slightly above the lower shell 4. Accordingly, an operation of loading the tape cartridge 1 is completed.

Alternatively, after the tape cartridge 1 is horizontally drawn into the cassette compartment 54, the reel shaft 56 and a reel motor 57 may be moved vertically upward together, and the reel shaft 56 may be inserted into the hub 7 of the tape reel 6 from the lower side (this will be described in detail in (6)).

Figure 11:
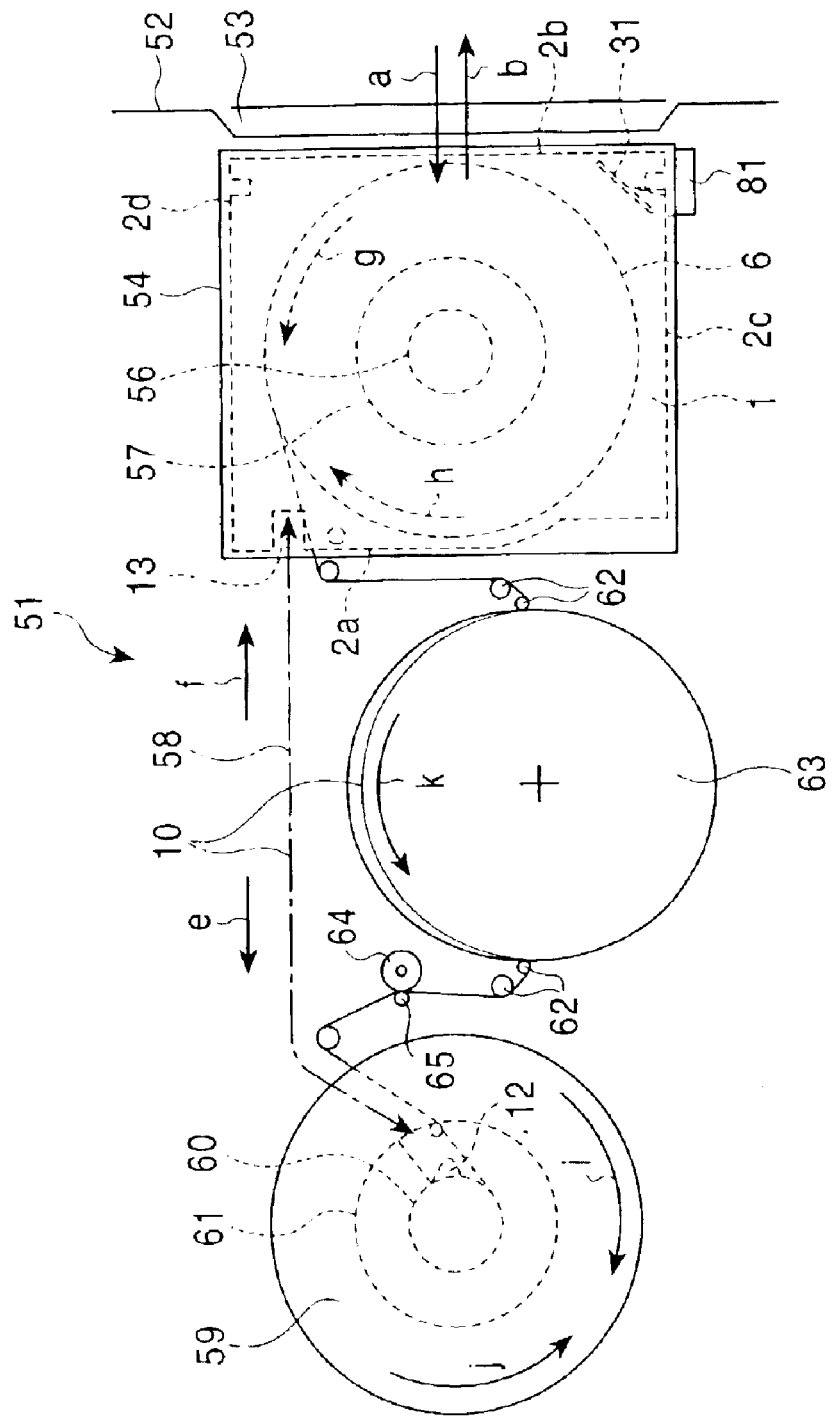
FIG. 11 is a plan view showing a magnetic recording/playback apparatus.

After the operation of loading the tape cartridge 1 is completed, as shown by the dotted chain line in FIG. 11, the leader block 12 is extracted from the tape-passage hole 13 of the tape cartridge 1, transferred approximately linearly along a tape path 58 in the direction shown by the arrow e, and attached to the a hub 60 of a take-up reel 59 mounted on the mechanical deck 55 by a leader-block loading unit of a tape-loading mechanism (not shown). While the leader block 12 is transferred in the direction shown by the arrow e, the reel motor 57 rotates the reel shaft 56 so that the tape reel 6 is rotated in the direction shown by the arrow g, that is, in the direction in which the tape-like recording medium 10 is unwound. Accordingly, the tape-like recording medium 10 is extracted from the tape cartridge 1 through the tape-passage hole 13 in the direction shown by the arrow e.

Then, as shown by the solid line in FIG. 11, the tape-like recording medium 10 is loaded around the periphery of a rotating head drum 63, which is placed on the mechanical deck 55, in the shape like a letter 'Ω' by a pair of loading guides 62 of the tape-loading mechanism. Accordingly, the tape-loading operation is completed.

Then, when a recording and/or playback command signal is input to the magnetic recording/playback apparatus 51 from the computer device or the like, a part of the tape-like recording medium 10 which is at a position close to the take-up reel 59 is pressed against a capstan 65, which is placed on the mechanical deck 55, by a pinch roller 64. At the same time, the tape reel 6 in the tape cartridge 1 is rotated by the supply reel motor 57 in the direction shown by the arrow g and the take-up reel 59 is rotated by a take-up reel motor 61, which is placed on the mechanical deck 55, in the direction shown by the arrow i, that is, in the direction in which the tape-like recording medium 10 is wound. Accordingly, the tape-like recording medium 10 is transferred in the direction shown by the arrow k at a constant speed, and the rotating head drum 63 records and/or plays back back-up information of the computer device, such as, image data and sound data, on the tape-like recording medium 10.

When an eject command is input after the information recording and/or playback operation is completed, the pair of loading guides 62 of the tape-loading mechanism and the pinch roller 64 automatically return to their original positions. In addition, the tape reel 6 in the tape cartridge 1 is rotated by the supply reel motor 57 in the direction shown by the arrow h, that is, in the direction in which the tape-like recording medium 10 is rewound, and the take-up reel 59 is rotated by the take-up reel motor 61 in the direction shown by the arrow j, that is, in the direction in which the tape-like recording medium 10 is unwound. Accordingly, the tape-like recording medium 10 is retracted into the tape cartridge 1 through the tape-passage hole 13 and rewound around the periphery of the tape reel 6, and the leader block 12 returns to the tape-passage hole 13 of the tape cartridge 1.

Then, although not shown in the figure, after the tape-like recording medium 10 is completely rewound, the tape cartridge 1 is moved vertically upward from the lower position to the upper position, and is pushed out from the cassette compartment 54 through the cartridge-receiving hole 53 for a predetermined amount in the direction shown by the arrow b. At this time, the tape reel 6 is locked by the reel lock mechanism 21 again. Then, the tape cartridge 1 is manually removed from the cartridge-receiving hole 53 in the direction shown by the arrow b.

(2) Explanations of Changer Grips Formed in the Single-reel Tape Cartridge and a Cartridge Changer Next, changer grips formed in the tape cartridge 1 and a cartridge changer of a library apparatus or the like will be described below with reference to FIGS. 1 to 10, 12, and 13.

As shown in FIGS. 1 to 10, among the three corners 2B, 2C, and 2D of the cartridge housing 2 of the tape cartridge 1 excluding the corner 2A at which the tape-passage hole 13 is formed, the corners 2C and 2D at the right and left ends of the posterior side 2b are provided with changer grips 28, which are formed symmetrically in the right-left direction. The changer grips 28 are formed at positions close to the posterior side 2b in such a manner that the changer grips 28 extend from end to end of the cartridge housing 2 formed by the upper and lower shells 3 and 4 in the Vertical direction. The changer grips 28 are formed as bracket-like shaped grooves 29 which are approximately symmetrical in the right-left direction.

Thus, the pair of changer grips 28 having shapes symmetrical in the right-left direction and extending from end to end of the tape cartridge 1 in the vertical direction are formed at the two corners 2C and 2D at the right and left ends of the posterior side 2b. Accordingly, this tape cartridge (single-reel tape cartridge) 1 can be exchanged automatically by a cartridge changer of a library apparatus. In addition, the mechanism and control of the cartridge changer is simplified.

Figure 12:
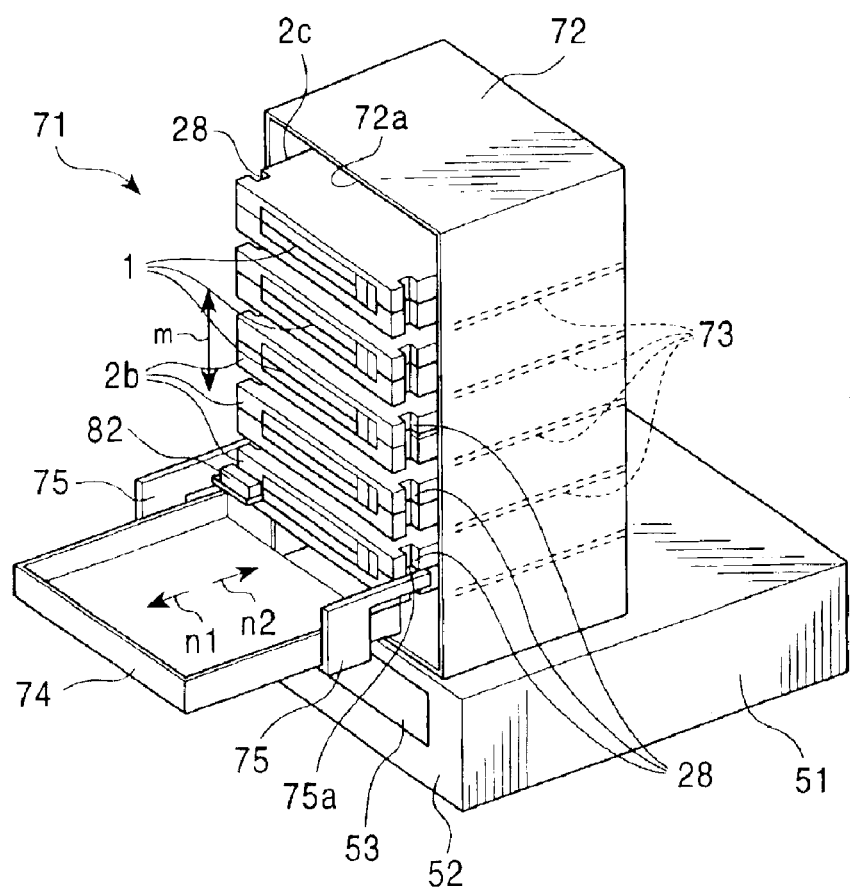
FIG. 12 is a plan view showing-a cartridge changer.
Figure 13:
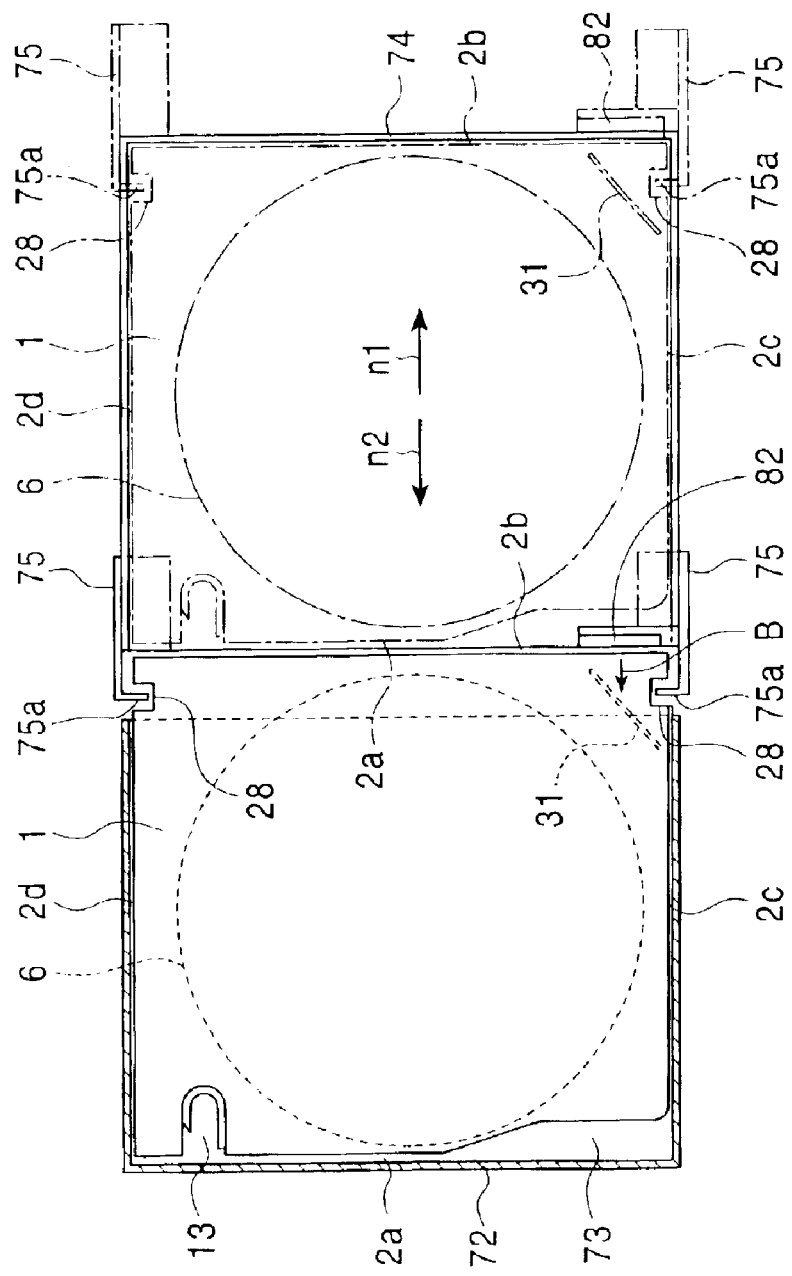
FIG. 13 is a partially broken plan view showing the main part of the cartridge changer.

More specifically, as shown in FIGS. 12 and 13, a cartridge changer 71 used in a library apparatus or the like includes a magazine 72 placed in an upright position. The magazine 72 is provided with a plurality of shelves 73, and a plurality of tape cartridges 1 are inserted between the shelves 73 from the anterior sides 2a thereof. Accordingly, the tape cartridges 1 are arranged in the vertical direction inside the magazine 72 in such a manner that the posterior sides 2b of the tape cartridges 1 project from the magazine 72 at the front side 72a thereof.

The changer grips 28 formed in each of the tape cartridges 1 at positions close to the posterior side 2b also project from the magazine 72 at the front side 72a thereof. Accordingly, the tape cartridges 1 are arranged such that the changer grips 28 are aligned in the vertical direction.

The cartridge changer 71 also includes the above-described magnetic recording/playback apparatus 51 placed below (or above) the magazine 72, and the cartridge-receiving hole 53 of the magnetic recording/playback apparatus 51 faces the same direction as the front side 72a of the magazine 72.

A tray 74 used for transferring the cartridges 1 is disposed in such a manner that the tray 74 is able to slide along the front sides of the magazine 72 and the magnetic recording/playback apparatus-51 in the vertical direction, that is, in the direction shown by the arrow m. The tray 74 is provided with a pair of hand arms 75 at the right and left sides thereof. The hand arms 75 move together in the direction shown by the arrows n1 and n2, that is, in the direction in which the tape cartridges 1 are inserted and extracted to/from the magazine 72 and the magnetic recording/playback apparatus 51. In addition, the hand arms 75 are formed symmetrically in the right-left direction, and end portions 75a of the hand arms 75 are bent vertically toward each other, that is, in the direction in which they oppose each other. The hand arms 75 do not need to perform an opening/closing operation.

In the tape cartridges 1 and the cartridge changer 71 which are constructed as described above, when the tray 74 is moved vertically in the direction shown by the arrow m, the end portions 75a of the hand arms 75 are able to move smoothly inside the changer grips 28 formed in the tape cartridges 1, which are aligned vertically inside the magazine 72, in the direction shown by the arrow m.

With reference to FIG. 13, the tray 74 is stopped in front of a designated shelf, as shown by the solid lines, and then the hand arms 75 are moved together in the direction shown by the arrow n1 to the positions shown by the dotted chain lines. Accordingly, the end portions 75a, which are placed insides the changer grips 28 of the designated tape cartridge 1, pull out the tape cartridge 1 from the magazine 72 in the direction shown by the arrow n1 and place it on the tray 74.

Then, the tray 74 is moved vertically downward (or upward) to the magnetic recording/playback apparatus 51, and the hand arms 75 are moved together in the direction shown by the arrow n2 in FIG. 13. Accordingly, the end portions 75a, which are placed inside the changer grips 28 of the tape cartridges 1, push the tape cartridge 1 in the direction shown by the arrow n2, so that the tape cartridge 1 is inserted into the magnetic recording/playback apparatus 51 through the cartridge-receiving hole 53 from the anterior side 2a. Then, the tape cartridge 1 is loaded in the magnetic recording/playback apparatus 51 and the information recording/playback operation is performed in the above-described manner.

After the information recording/playback operation is performed by the magnetic recording/playback apparatus 51, the end portions 75a of the hand arms 75 pull out the tape cartridge 1 by the changer grips 28 and place the tape cartridge 1 on the tray 74. Then, the tray 74 is moved upward (or downward) to the designated shelf, and the tape cartridge 1 placed on the tray 74 is pushed by the end portions 75a of the hand arms 75, so that the tape cartridge 1 is inserted onto the designated shelf. In this manner, the tape cartridges 1 are automatically exchanged.

(3) Explanations of a Memory Module of the Single-reel Tape Cartridge and Memory-access Modules of the Magnetic Recording/playback Apparatus and the Cartridge Changer Next, the MIC 31, which is a memory module mounted in the tape cartridge 1, and remote interfaces 81 and 82, which are memory-access modules mounted in the magnetic recording/playback apparatus 51 and on the tray 74 of the cartridge changer 71, will be explained with reference to FIGS. 1 to 16.

As shown in FIGS. 1, 2, and 5 to 10, the MIC 31 is formed as a non-contact, nonvolatile memory having no connecting terminals. The MIC 31 is constructed by mounting a memory unit on a surface 32a of an MIC substrate 32, which is a small printed substrate. An antenna unit 34 used for radio communication to/from the memory unit is formed on the surface 32a by printing a copper foil pattern. The memory unit 33 stores management information for the tape-like recording medium 10 such as the length, the thickness, the material, etc.

The MIC 31 is placed in, for example, the triangular space 14C at the corner 2C between the posterior side 2b and the right side 2c of the cartridge housing 2 of the tape cartridge 1. The MIC 31 may also be placed at the other corners, for example, at the corners 2B and 2D.

Figure 10:
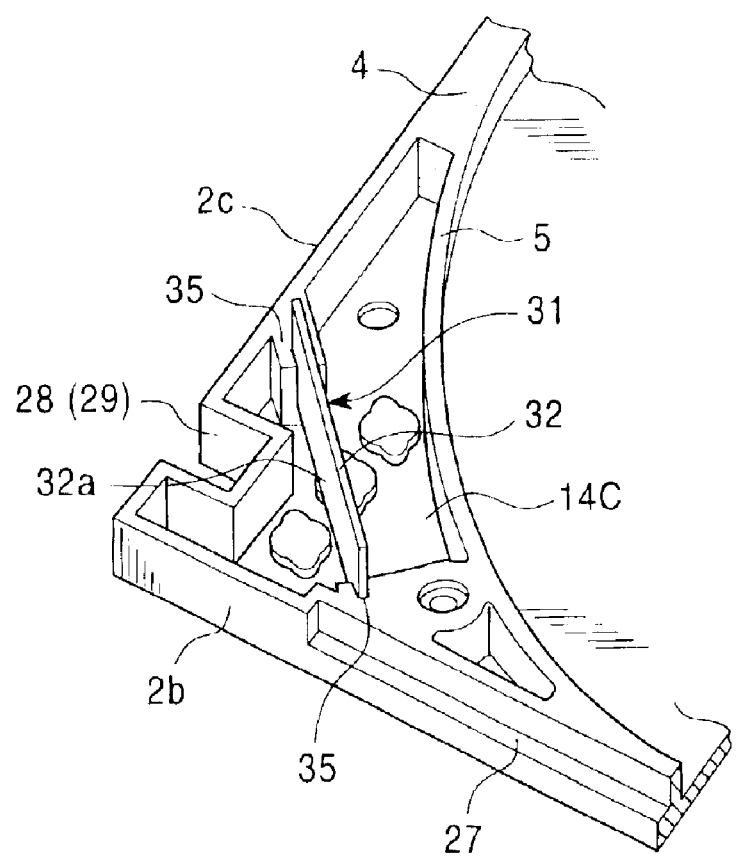
FIG. 10 is a perspective view showing a part at which the MIC is mounted in the tape cartridge.

As shown in FIG. 10, the end portions 32b of the MIC substrate 32 in the longitudinal direction are fitted inside substrate-receiving grooves 35, which are formed vertically in the upper and lower shells 3 and 4, in the upright position. Accordingly, the MIC 31 is mounted in the triangular space 14C in the upright position.

In addition, the MIC substrate 32 is disposed in the upright position in such a manner that the MIC substrate 32 is inclined by 45° relative to the posterior side 2b and the right side 2c of the cartridge housing 2. Accordingly, the antenna unit 34 faces two directions which are perpendicular to the posterior side 2b and the right side 2c of the cartridge housing 2, that is, the directions shown by the arrows A and B. One of the changer grips 28 is effectively disposed in a rectangular space 36 surrounded by the MIC 31, the posterior side 2b, and the right side 2c.

Figure 3:
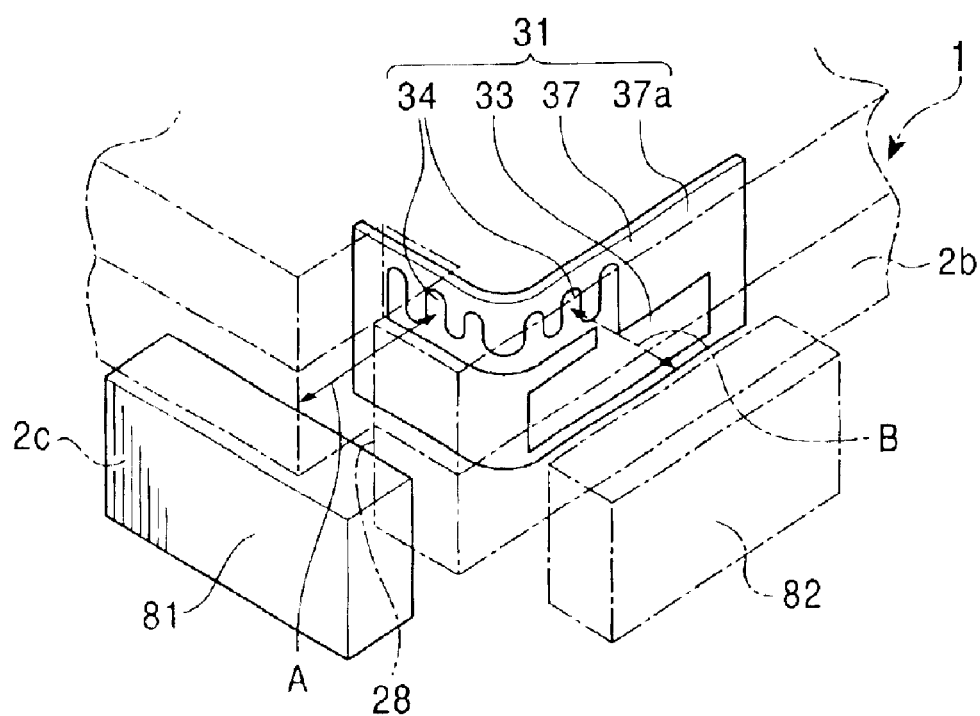
FIG. 3 is a diagram showing a main part of an MIC according to a second embodiment.
Figure 4:
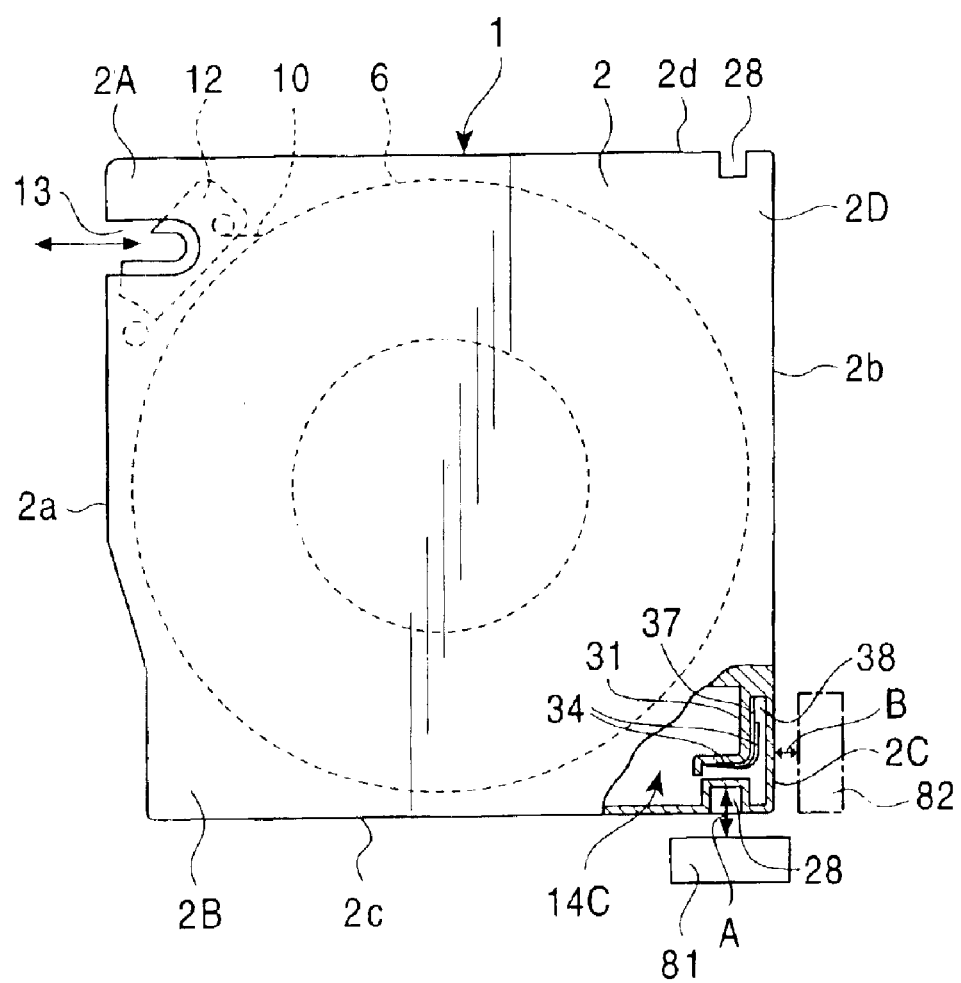
FIG. 4 is a partially broken plan view showing a position at which the MIC shown in FIG. 2 is mounted.

The MIC 31 may also be constructed as shown in FIGS. 3 and 4. This MIC 31 is constructed by mounting a memory unit 33 and printing an antenna unit 34 on a surface 37a of an MIC substrate 37, which is a flexible printed substrate. The MIC substrate 37 is inserted in substrate-receiving groove 38 which are formed in the upper and lower shells 3 and 4 in such a manner that the substrate-receiving grooves 38 are curved approximately perpendicularly along the posterior side 2b and the right side 2c. Accordingly, the MIC substrate 37 is disposed in the upright position in such a manner that-the MIC substrate 37 is bent approximately perpendicularly.

Accordingly, the antenna unit 34 is also bent approximately perpendicularly along the posterior side 2b and the right side 2c, so that the antenna unit 34 faces two directions which are perpendicular to the posterior side 2b and the right side 2c of the cartridge housing 2, that is, the directions shown by the arrows A and B.

As shown by the solid lines in FIGS. 1 to 4 and in FIG. 11, the magnetic recording/playback apparatus 51 includes a memory interface 81 used for writing and/or reading the management information on the MIC 31, which is installed in the tape cartridges 1. The memory interface 81 is mounted on, for example, the cassette compartment 54 in such a manner that the memory interface 81 is parallel to the right side 2c of the tape cartridge 1 and is at a position close to the MIC 31 when the tape cartridge 1 is loaded.

In addition, as shown by the dotted chain lines in FIGS. 1 to 4 and in FIGS. 12 and 13, the cartridge changer 71 includes a memory interface 82 used for writing and/or reading the management information on the MIC 31, which is installed in the tape cartridges 1. The memory interface 82 is mounted on, for example, the inside surface of one of the hand arms 75 of the tray 74 in such a manner that the memory interface 82 is parallel to the posterior side 2b of the tape cartridges 1 and is at a position close to the MIC 31 when the tape cartridge 1 is disposed in the magazine 72.

Accordingly, as shown in FIG. 11, when the operation of loading the tape cartridges 1 in the magnetic recording/playback apparatus 51 is completed, the MIC 31 is placed at a position close to the memory interface 81, which is parallel to the right side 2c. Then, electric power is supplied to the memory unit 33 of the MIC 31 and the operation of reading and/or writing the management information is performed by radio communication (access) between an antenna unit of the memory interface 81, which will be described below, and the antenna unit 34 of the MIC 31.

Since the memory interface 81 can be disposed at one of the sides in the magnetic recording/playback apparatus 51, the depth of the magnetic recording/playback apparatus 51 in the front-rear direction can be prevented from being increased as in the case in which the memory interface 81 is placed between the posterior side 2b of the loaded tape cartridge 1 and the front panel 52. In addition, even when the magnetic recording/playback apparatus 51 is of the type in which the posterior side 2b of the loaded tape cartridge 1 projects outside from the cartridge-receiving hole 53, the radio communication (access) with the MIC 31 is reliably performed.

In addition, as shown in FIGS. 12 and 13, in the cartridge changer 71, the memory interface 82 is mounted on, for example, the inside surface of one of the hand arms 75 of the tray 74 in such a manner that the memory interface 82 is parallel to the posterior side 2b of the tape cartridge 1 when the tape cartridge 1 is disposed in the magazine 72. Accordingly, the moving space of the hand arm 75 with the memory interface 82 in the direction shown by the arrows m and n can be prevented from being increased as in the case in which the memory interface 82 is mounted on the outside surface of the hand arm 75. In addition, when the end portions 75a of the hand arms 75 are inserted in the changer grips 28 of the designated tape cartridge 1 stored in the magazine 72, the memory interface 82 immediately comes to a position close to the MIC 31 from the direction shown by the arrow B. Accordingly, the management information recorded in the MIC 31 can be obtained quickly, so that the time required for exchanging the tape cartridges 1 can be reduced.

In the present embodiment, the MIC 31 is disposed such that the antenna unit 34 opposes both the posterior side 2a and the right side 2c of the tape cartridge 1. However, the MIC 31 may also be disposed such that the antenna unit 34 opposes the posterior side 2a and the left side 2d, the posterior side 2a and the top side 2e, the posterior side 2a and the bottom side 2f, the right side 2c and the top side 2e, the right side 2c and the bottom side 2f, the left side 2d and the top side 2e, or the left side 2d and the bottom side 2f. In addition, the MIC 31 may also be disposed such that the MIC 31 is inclined relative to the posterior side 2b and the right side 2c by 45° and the surface 32a of the MIC 31 is inclined upward or downward by 45°, so that the antenna unit 34 opposes three surfaces: the posterior side 2b, the right side 2c, and the top side 2e or the bottom side 2f.

Next, the MIC 31 mounted in the tape cartridge 1 and a control circuit 84 for the magnetic recording/playback apparatus 51 will be explained below.

Figure 14:
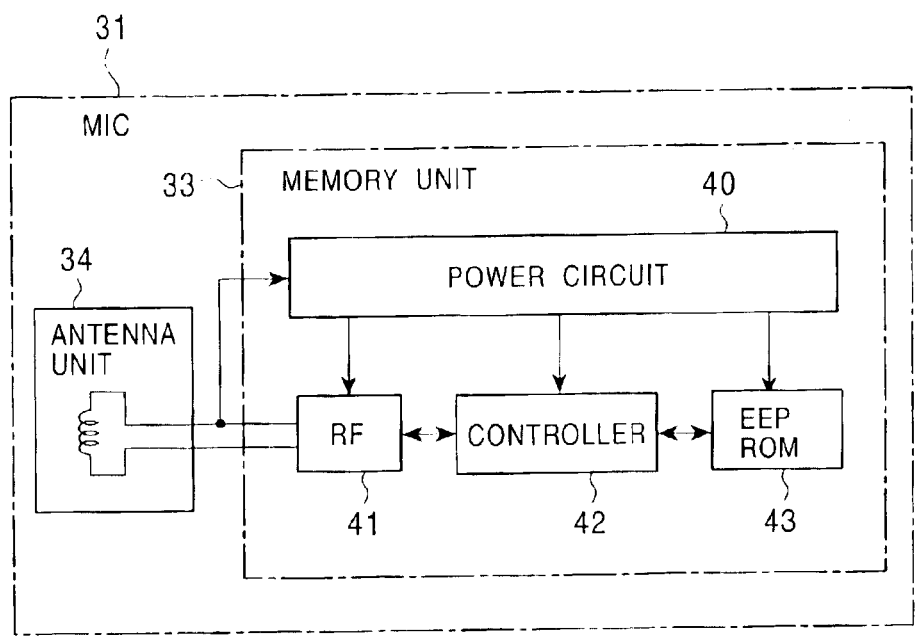
FIG. 14 is a block diagram of the MIC.

As shown in FIG. 14, the MIC 31 mounted in the tape cartridge 1 includes the memory unit 33 and the antenna unit 34. The memory unit 33 is constructed as a semiconductor IC including a power circuit 40, a radio frequency (RF) processing unit 41, a controller 42, and an Electrically Erasable Programmable Read-Only Memory (EEP-ROM) 43. The memory unit 33, for example, is mounted on the MIC substrate 32, and the antenna unit 34 is formed as a copper foil pattern.

The MIC 31 is driven by receiving electric power from the external environment via a communication antenna of the remote interface 81, which will be described below. More specifically, carrier waves of, for example, 13 MHz frequency band, are used for the communication between the MIC 31 and the communication antenna. The carrier waves of 13 MHz frequency band are transmitted from the communication antenna, received by the antenna unit 34, and converted into a direct current by the power circuit 40. Then, the direct current is fed to the RF processing unit 41, the controller 42, and the EEP-ROM 43.

The RF processing unit 41 demodulates the received information and modulates the information to be transmitted. The controller 42 decodes the received signals obtained from the RF processing unit 41, and performs processes, for example, read/write processes on the EEP-ROM 43, in accordance with the decoded information (command).

More specifically, the MIC 31 is activated by receiving the electric waves transmitted from the communication antenna, and the controller 42 performs processes corresponding to commands carried by the carrier waves and manages data stored in the EEP-ROM 43, which is a nonvolatile memory.

The MIC 31 stores date and place of manufacture, the thickness and material of the tape-like recording medium 10, information for identifying the kind of the tape cassette, etc., for each tape cartridge 1. When the tape cartridge 1 is loaded in the magnetic recording/playback apparatus 51, these data items are read out via the communication antenna. In addition, the MIC 31 also stores information regarding the usage history, etc., of the data recorded on the tape-like recording medium 10, user information, etc.

Next, with reference to FIG. 15, the control circuit 84, which is stored in the magnetic recording/playback apparatus 51 and which includes a memory drive circuit and a system control circuit, will be described below.

As described above, the magnetic recording/playback apparatus 51 is constructed such that the rotating head drum 63 performs the data recording/playback operation on the tape-like recording medium 10 of the loaded tape cartridge 1 by a helical scan method. The rotating head drum 63 includes two write heads WH1 and WH2 having different azimuth angles and three read heads RH1, RH2, and RH3 having a predetermined azimuth angle, the read heads RH1, RH2, and RH3 being formed at a predetermined angle-pitch. In addition, the magnetic recording/playback apparatus 51 includes a plurality of driving motors such as a supply reel motor SRM, a take-up reel motor TRM, a drum motor DM, a capstan motor CM, a tape-loading motor LDM, and a cartridge-loading motor EM. These motors are rotated by electric power supplied from a mechanical driver 85.

A servo controller 86 controls the mechanical driver 85, which drives each of the driving motors. The servo controller 86 controls the rotational speed of each driving motor so as to control the movement of the tape during normal recording/playback operation, high-speed playback, fast-forward, wind-back, etc., and to perform tape-cartridge receiving/ejecting operation, tape loading/unloading operation, tape-straining operation, etc.

In order for the servo controller 86 to perform servo-control of each driving motor, each driving motor is provided with a frequency generator (FG), so that information regarding rotation of each driving motor can be obtained.

The servo controller 86 determines the rotational speed of each driving motor on the basis of FG pulses, calculates the error between the determined rotational speed and the desired rotational speed for each driving motor, and controls the mechanical driver 85 such that the mechanical driver 85 supplies electric power corresponding to the error. Thus, a closed-loop control is performed for the rotational speed of each driving motor. Accordingly, the servo controller 86 controls each driving motor on the basis of the desired rotational speeds corresponding to the desired operation, for example, constant-speed transferring during recording/playback operation, high-speed search, fast-forward, wind-back, etc.

The EEPROM 87 stores constant values, etc., used by the servo controller 86 to perform servo control of each driving motor. The servo controller 86 is interactively connected to the EEPROM 87 and to a system controller 89, which is a system control circuit for controlling the overall system, via an interface controller/error-checking and correction formatter (hereinafter referred to as IF/ECC controller) 88.

A hole detection mechanism 90 detects the above-described detection holes 19 and generates detection information representing whether or not write-protect is set, the kind of the tape cartridge 1, etc.

The detection information generated by the hole detection mechanism 90 is supplied to the system controller 89, so that the system controller 89 obtains the information regarding the loaded tape cartridge 1 such as whether or not write-protect is set, the kind of the tape cartridge 1, etc.

In the magnetic recording/playback apparatus 51, a Small Computer System Interface (SCSI) 91 is used for data input/output. For example, during data-recording operation, data items are successively input from a host computer 92 to the SCSI 91 in data units called 'record' having a predetermined length, and are supplied to a compression/decompression circuit 94 via the a SCSI buffer controller 93. The SCSI buffer controller 93 is used to control data transmission to/from the SCSI 91, and is provided with a SCSI buffer memory 95 in order to set the transmission speed of the SCSI 91 to a predetermined speed.

In the control circuit 84, data items may also be transferred from the host computer 92 in data units having a variable length.

The compression/decompression circuit 94 compresses the input data by a predetermined compressing method if necessary. When, for example, an LZ-code method is used as the compressing method, dedicated codes are assigned to each character string which has already been processed and data items are stored in the form of a dictionary. When a character string is newly input, it is searched for in the dictionary, and if the character string is in the dictionary with a code assigned to this character string, that character string is replaced by the corresponding code. If the character string is not in the dictionary, a new code is assigned to this character string, and that character is registered in the dictionary. Accordingly, data including character strings is compressed by registering the character strings in the dictionary and replacing them by the codes registered in the dictionary.

Data output from the compression/decompression circuit 94 is supplied to the IF/ECC controller 88, which temporarily stores the data output from the compression/decompression circuit 94 in a buffer memory 96. The data stored in the buffer memory 96 is processed by the IF/ECC controller 88 in data units called 'group' having a constant length corresponding to, for example, 58 tracks of the tape-like recording medium 10, and ECC formatting of this data is performed.

In the EEC formatting process, correction codes for errors are attached to recording data, and the data is modulated such that the data becomes compatible with magnetic recording. Then, the data is supplied to the RF processor unit 97.

The RF processor unit 97 performs amplification, record equalization, etc., of the recording data and generates recording signals. The recording signals are supplied to the write heads WH1 and WH2, which record the data on the tape-like recording medium 10.

Next, data playback operation will be described. Data recorded on the tape-like recording medium 10 is obtained by the read heads RH1, RH2, and RH3 as RF playback signals, and the RF processor unit 97 performs playback equalization, playback-clock generation, binarization, decoding (for example, Viterbi decoding), etc., of the playback signals.

The thus obtained signals are supplied to the IF/ECC controller 88, where error-correction is performed. Then, the obtained data is temporarily stored in the buffer memory 96, and is supplied to the compression/decompression circuit 94 at a predetermined time.

The system controller 89 determines whether or not the data has been compressed by the compression/decompression circuit 94 in the recording process, and the compression/decompression circuit 94 decompresses the data if it is compressed. If the data is not compressed, the compressing/decompressing circuit 94 outputs the data as it is.

The data output from the compression/decompression circuit 94 is input to the host computer 92 via the SCSI buffer controller 93 and the SCSI 91 as playback data.

Figure 15:
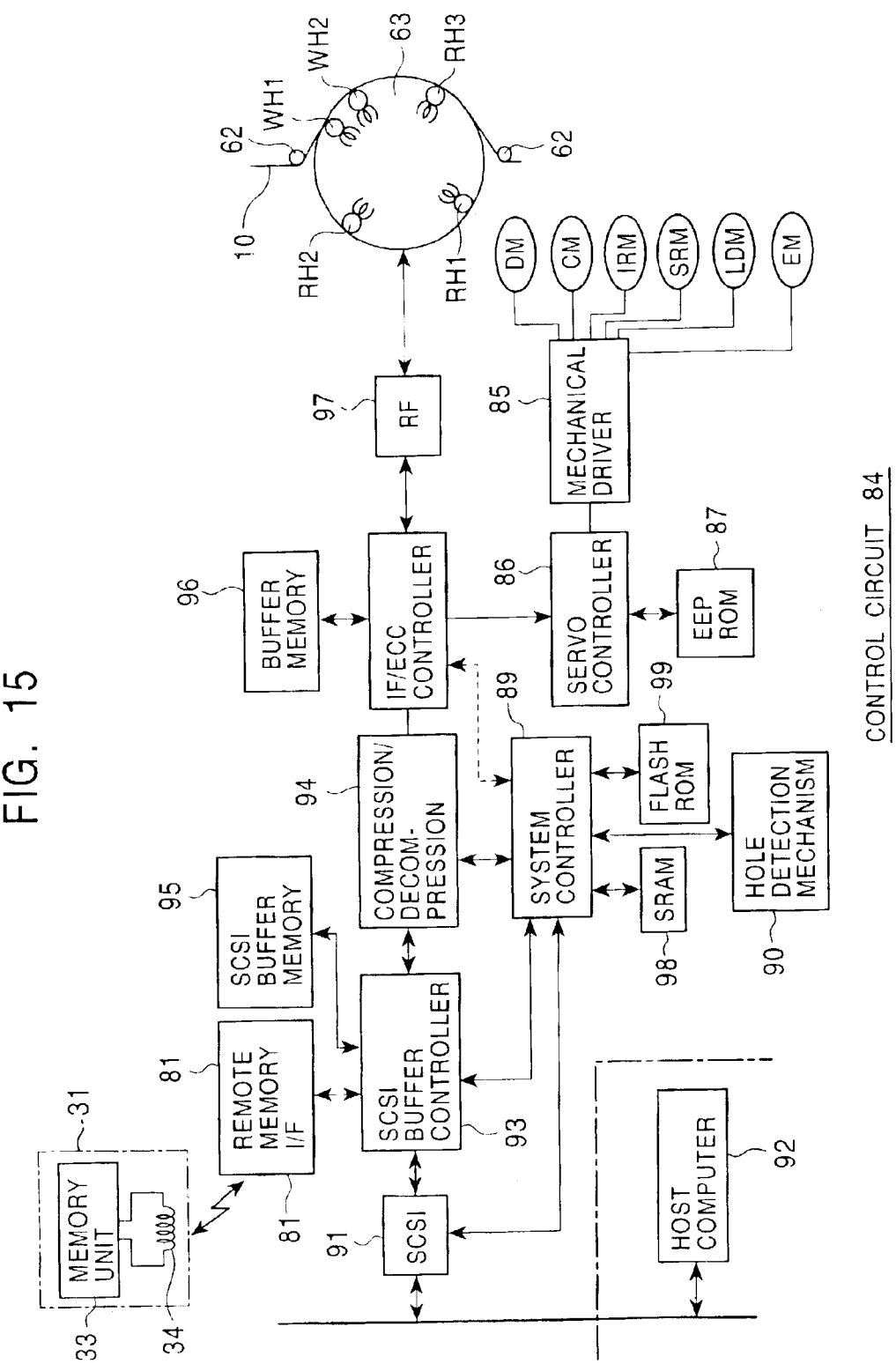
FIG. 15 is a block diagram of a control circuit of the magnetic recording/playback apparatus.

The MIC 31 contained in the tape cartridge 1 is also shown in FIG. 15. When the tape cartridge 1 is loaded in the magnetic recording/playback apparatus 51, the MIC 31 becomes able to communicate data with the system controller 89 via the remote memory interface 81, which serves as a memory drive circuit, without contacting it.

Figure 16:
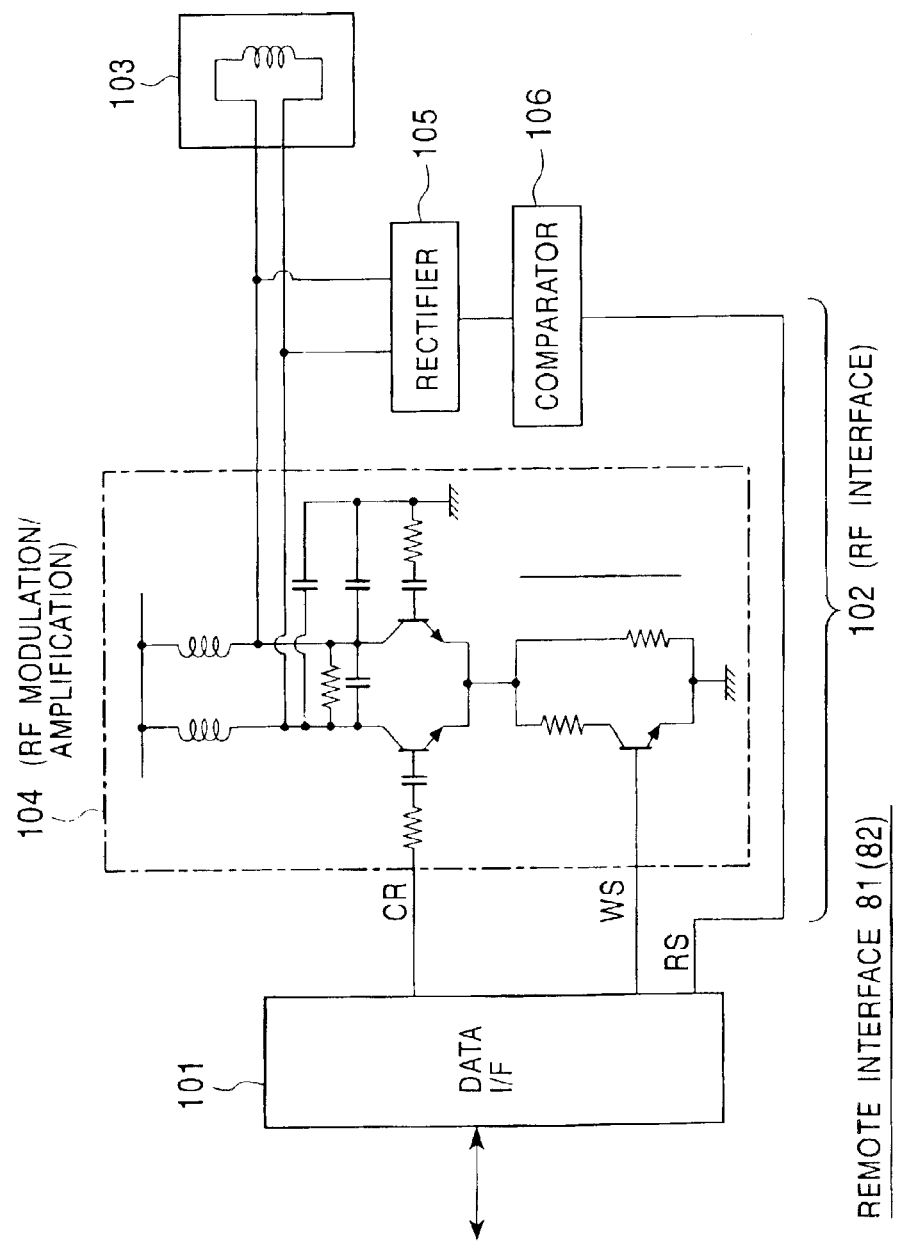
FIG. 16 is a block diagram of a remote interface of the control circuit.

Next, the remote memory interface 81 will be described with reference to FIG. 16.

The remote memory interface 81 includes a data interface 101 which communicates data with the system controller 89. As will be described below, data communication with the MIC 31 is performed such that a command is first transmitted from the device, and an acknowledge signal is transmitted from the MIC 31 in correspondence to the command. When the system controller 89 transmits a command to the MIC 31, the data interface 101 receives command data and a clock signal from the SCSI buffer controller 93. Then, the data interface 101 supplies the command data to a RF interface 102 in accordance with the clock signal. In addition, the data interface 101 also supplies a carrier wave frequency CR (13 MHz) to the RF interface 102.

The RF interface 102 includes a RF modulation/amplification circuit 104, which performs amplitude modulation (100 KHz) of the command (transmission data) WS and superposes it on the carrier-wave frequency CR, amplifies the modulated signal, and supplies the signal to a communication antenna 103.

Accordingly, the command data is transmitted from the RF modulation/amplification circuit 104 to the antenna unit 34 of the MIC 31 installed in the tape cartridge 1 via the communication antenna 103. As explained above with reference to FIG. 14, the MIC 31 installed in the tape cartridge 1 is activated when the antenna unit 34 receives the command data, and the controller 42 performs operations in accordance with the command. For example, the controller 42 writes data transmitted along with a write command on the EEP-ROM 43.

In addition, when a command is transmitted from the remote interface 81, the MIC 31 transmits an acknowledge signal corresponding to the command in response. More specifically, the controller 42 of the MIC 31 commands the RF processing unit 41 to modulate and amplify acknowledge data and transmit the data from the antenna unit 34.

When the thus transmitted acknowledge signal is received by the communication antenna 103 of the remote memory interface 81, the received signal is rectified by a rectification circuit 105 of the RF interface 102, demodulated by a comparator 106 as data, and supplied to the system controller 89 via the data interface 101. When, for example, the system controller 89 transmits a read command to the MIC 31, the MIC 31 transmits a corresponding acknowledge code and data read out from the EEP-ROM 43 in response. Then, the acknowledge code and the data read from the EEP-ROM 43 are received and demodulated by the remote memory interface 81, and are supplied to the system controller 89.

With reference to FIG. 15 again, a Static Random Access Memory (S-RAM) 98 and a flash Read-Only Memory (ROM) 99 store data used by the system controller 89 in various processes.

For example, the flash ROM 99 stores constant values, etc., used in a control operation, and the S-RAM 98 is used sometimes as working memory, and sometimes as a memory for storing and processing data read out from the MIC 31, data to be recorded in the MIC 31, mode data set for each tape cartridge 1, various flag data, etc.

The S-RAM 98 and the flash ROM 99 may be constructed as internal memories of a microcomputer serving as the system controller 89, or a part of the buffer memory 96 may be used as a working memory.

Although FIG. 15 shows a case in which the tape cartridge 1 provided with the MIC 31 is loaded, the magnetic recording/playback apparatus 51 is constructed such that the recording/playback operation can be performed even when the tape cartridge 1 is not provided with the MIC 31. In such a case, management information for the tape cartridge 1 is recorded in a management region of the tape-like recording medium 10. Accordingly, the magnetic recording/playback apparatus 51 reads and/or updates the management information recorded on the tape-like recording medium 10.

(4) Explanations of the Leader Tape and a Striped Portion, Which is Used for Identifying Recording Media, of the Single-reel Tape Cartridge and the Recording/playback Apparatus The leader tape portion and a striped portion used for identifying recording media and the recording/playback apparatus will be described below with reference to FIGS. 6 and 17 to 22.

The tape cartridge may contain various kinds of tape-like recording media such as a Metal-Evaporated tape (ME tape), a Metal Particle (MP) tape, etc. Accordingly, the kind of the tape-like recording medium and the tape format must be determined by the tape drive and the recording/playback operation must be performed in accordance with the determination result.

Figure 17:
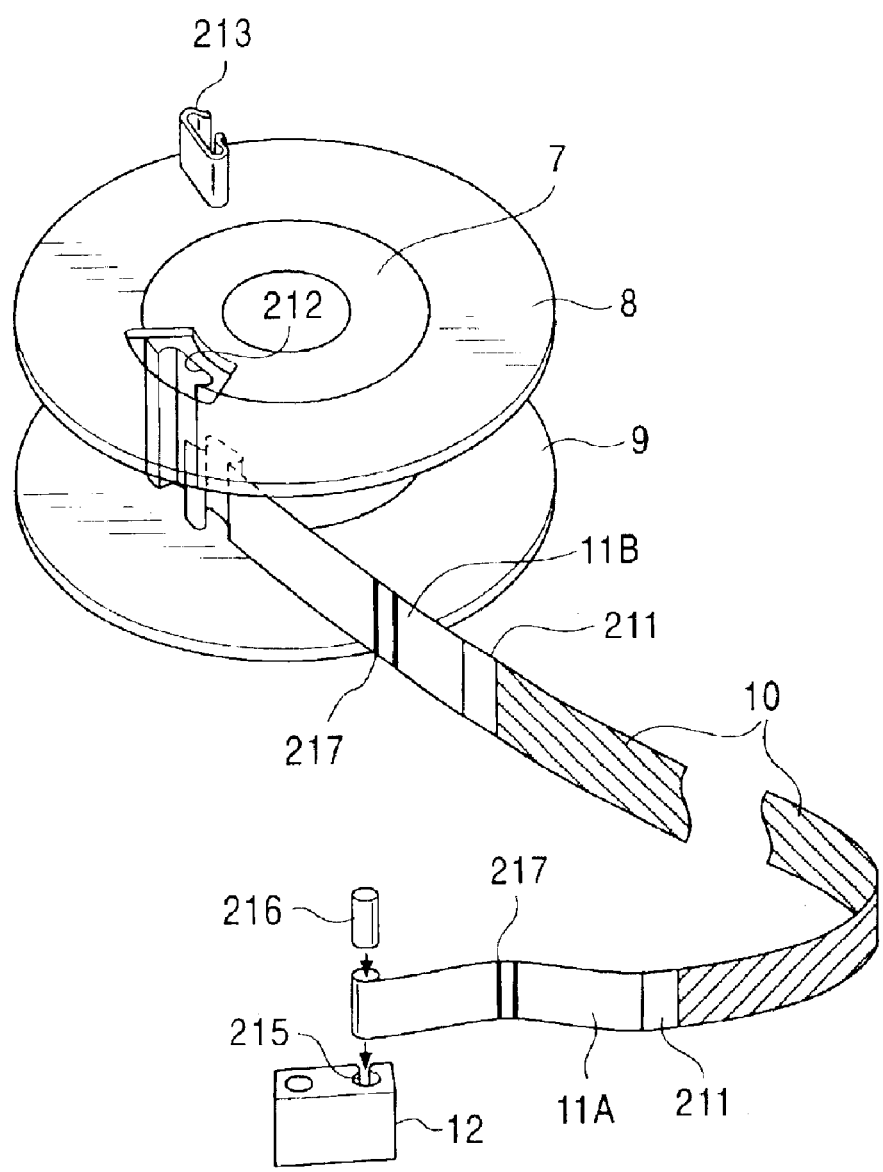
FIG. 17 is a perspective view showing the construction of the tape reel and a tape-like recording medium inside the tape cartridge.

As shown in FIG. 17, the tape-like recording medium 10 is wound around the hub 7 at a position between the upper flange 8 and the lower flange 9, and a first end thereof is fixed on the periphery of the hub 7 and a second end of the tape-like recording medium 10 is at the periphery of the tape reel 6. The tape-like recording medium 10 includes leader-tape portions 11A and 11B at the first end, the second end, or both ends thereof. The leader-tape portions 11A and 11B are transparent, and are connected to a medium portion, which is used for magnetic recording, of the tape-like recording medium 10 with splicing tape portions 211.

The first end of the tape-like recording medium 10 is fixed to the hub 7 by clamping the leader tape portion 11B at the first end between a clamping recess 212 formed in the hub 7 of the tape reel 6 and a damper 213 which is fitted into the clamping recess 212. The damper 213 is formed of a synthetic resin having flexibility, and is fitted into the clamping recess 212 while it deforms elastically by applying an external force. When the external force is removed, the damper 213 is retained by the clamping recess 212 so that the damper 213 does not fall down from the clamping recess 212. Accordingly, the leader tape portion 11B is fixed to the hub 7 by being clamped between the clamping recess 212 and the damper 213.

The leader block 12 is attached to the second end of the tape-like recording medium 10. The leader block 12 is provided with an engaging hole 215, and is attached to the leader tape portion 11A at the second end of the tape-like recording medium 10 by inserting the leader tape portion 11A into the engaging hole 215 and fitting a clamp pin 216 into the engaging hole 215.

Figure 18:
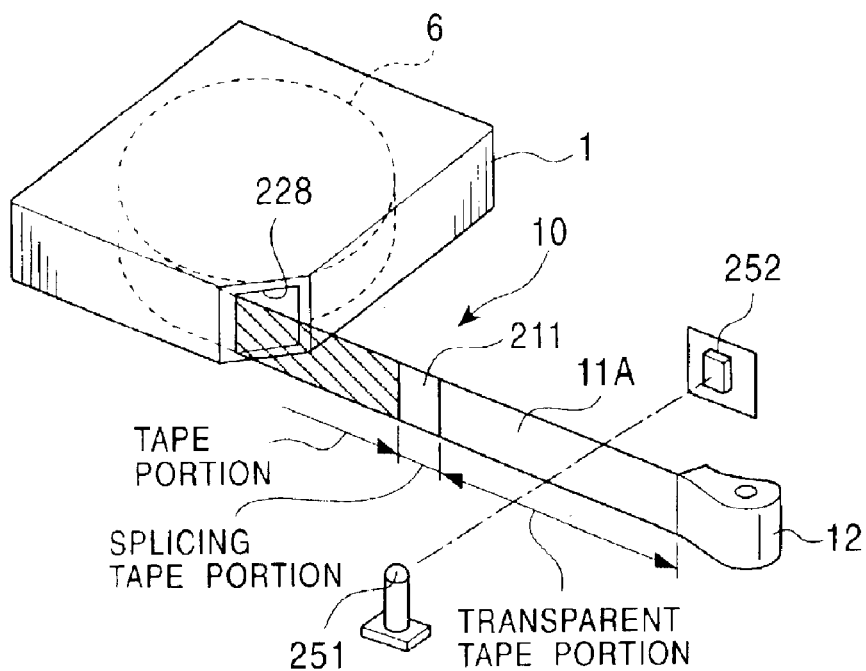
FIG. 18 is a perspective view showing a manner in which the tape cartridge is used.
Figure 19:
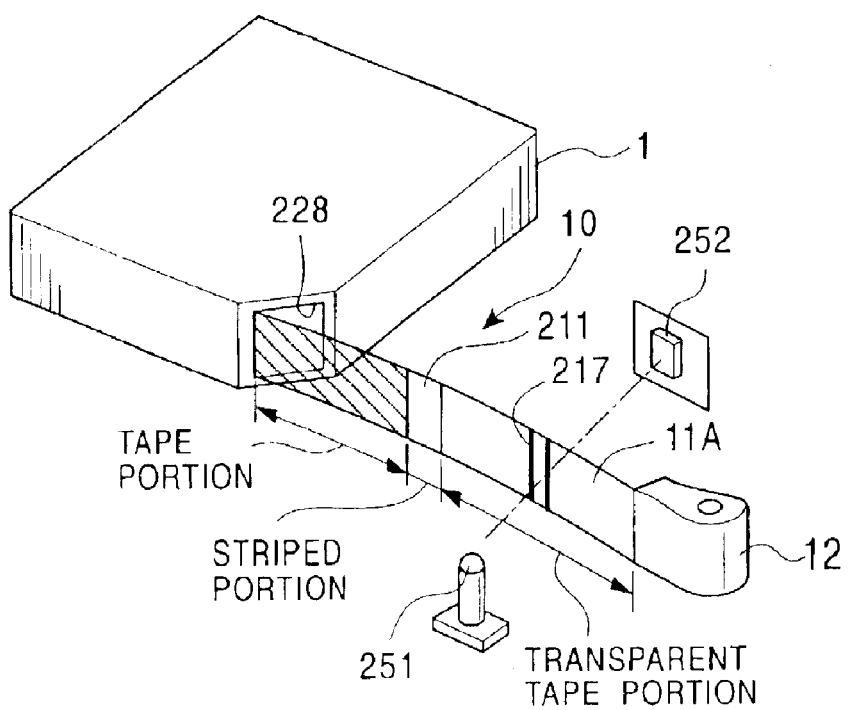
FIG. 19 is a perspective view showing a manner in which the a tape cartridge having a striped portion is used.

As shown in FIG. 18, when the tape cartridge is loaded in the recording/playback apparatus, the leader block 12 is pulled away from the cartridge 1 so that the tape-like recording medium 10 is extracted from the cartridge 1 from the second end thereof through a hole 228 formed in the cartridge 1. Then, the tape-like recording medium 10 is subjected to the information recording/playback operation.

In addition, as shown in FIG. 17, the leader-tape portions 11A and 11B formed at the first end, the second end, or both ends of the tape-like recording medium 10 are provided with striped portions 217 for identifying the medium. The striped portions 217 of the leader-tape portions 11A and 11B are formed as one or more stripes which are perpendicular to the side edges of the tape-like recording medium 10. The kind of the tape cartridge is determined by detecting the number of stripes forming the striped portion 217.

Figure 6:
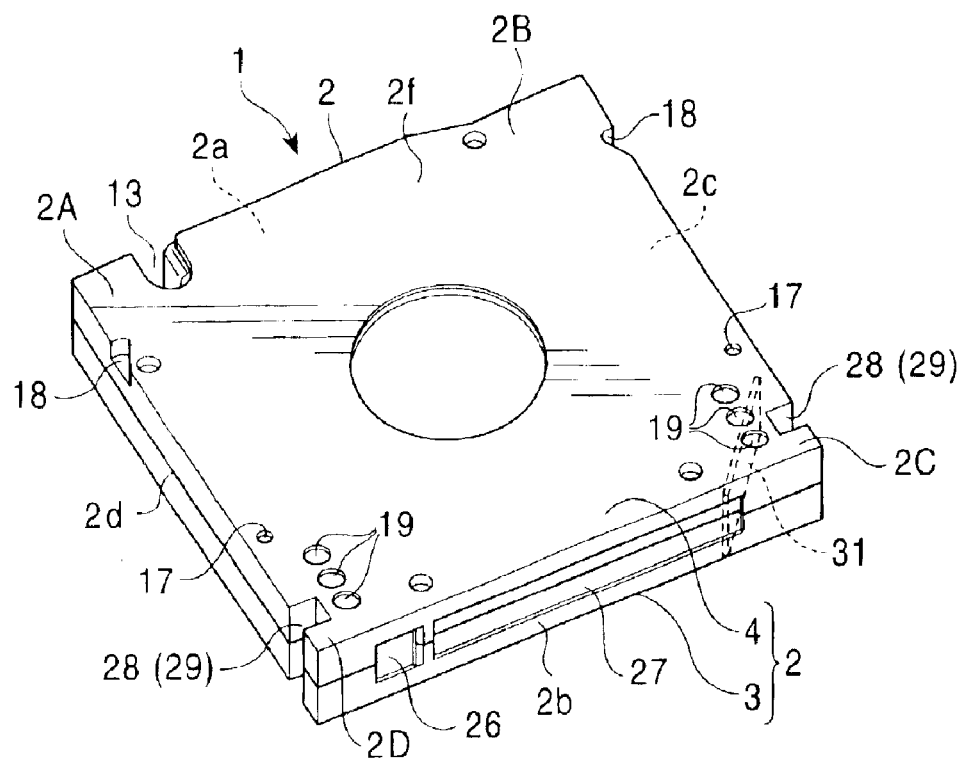
FIG. 6 is a perspective view of the tape cartridge as seen from the lower side.
Figure 7:
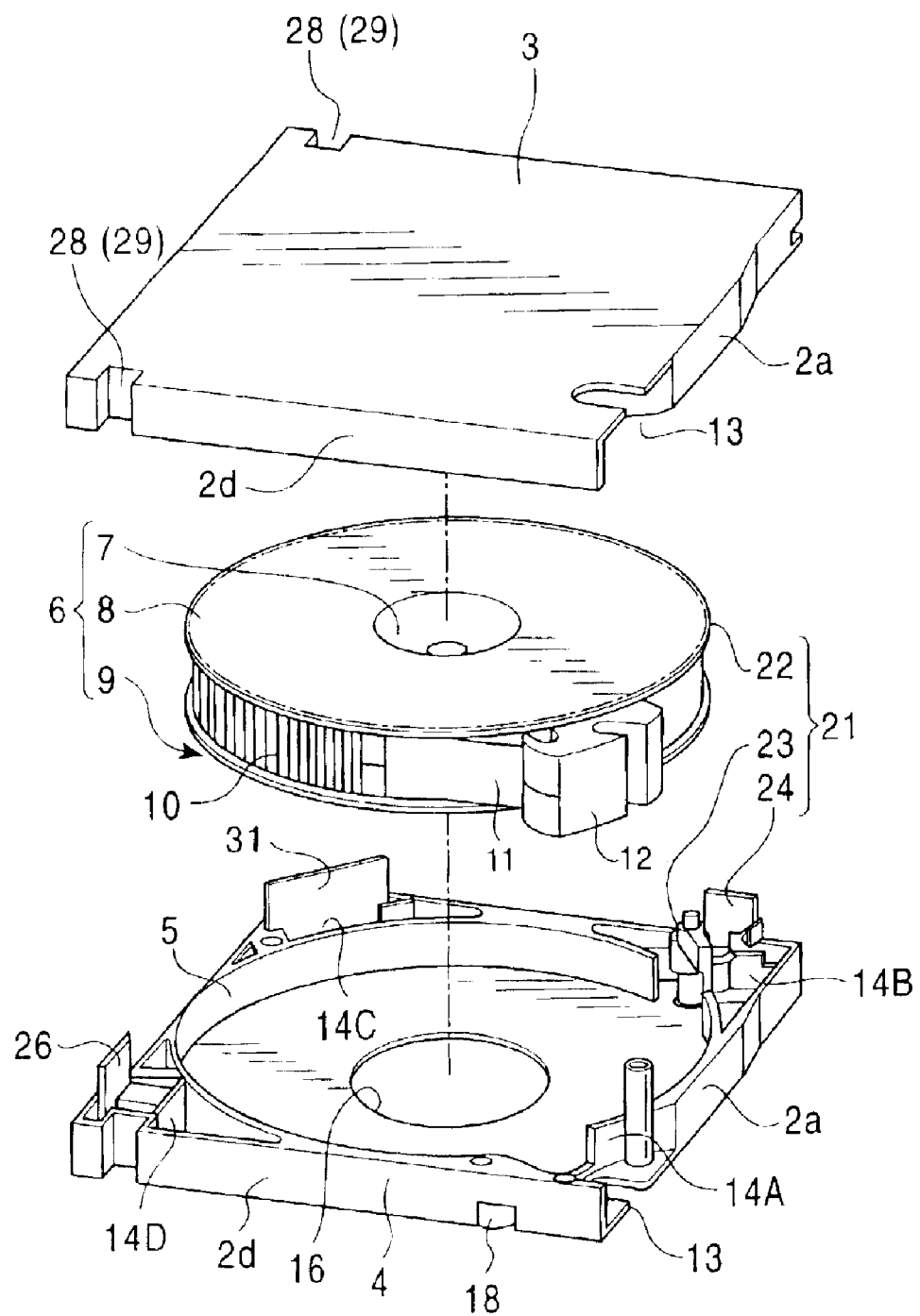
FIG. 7 is an exploded perspective view of the tape cartridge.
Figure 8:
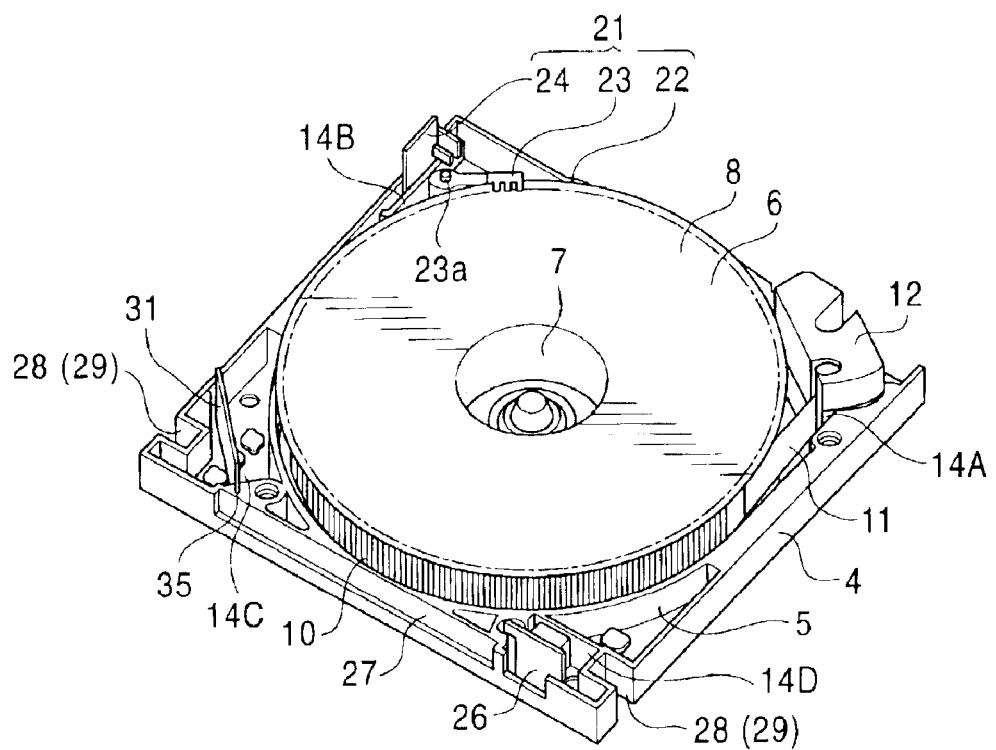
FIG. 8 is a perspective view showing a tape reel and a lower shell of the tape cartridge.
Figure 9:
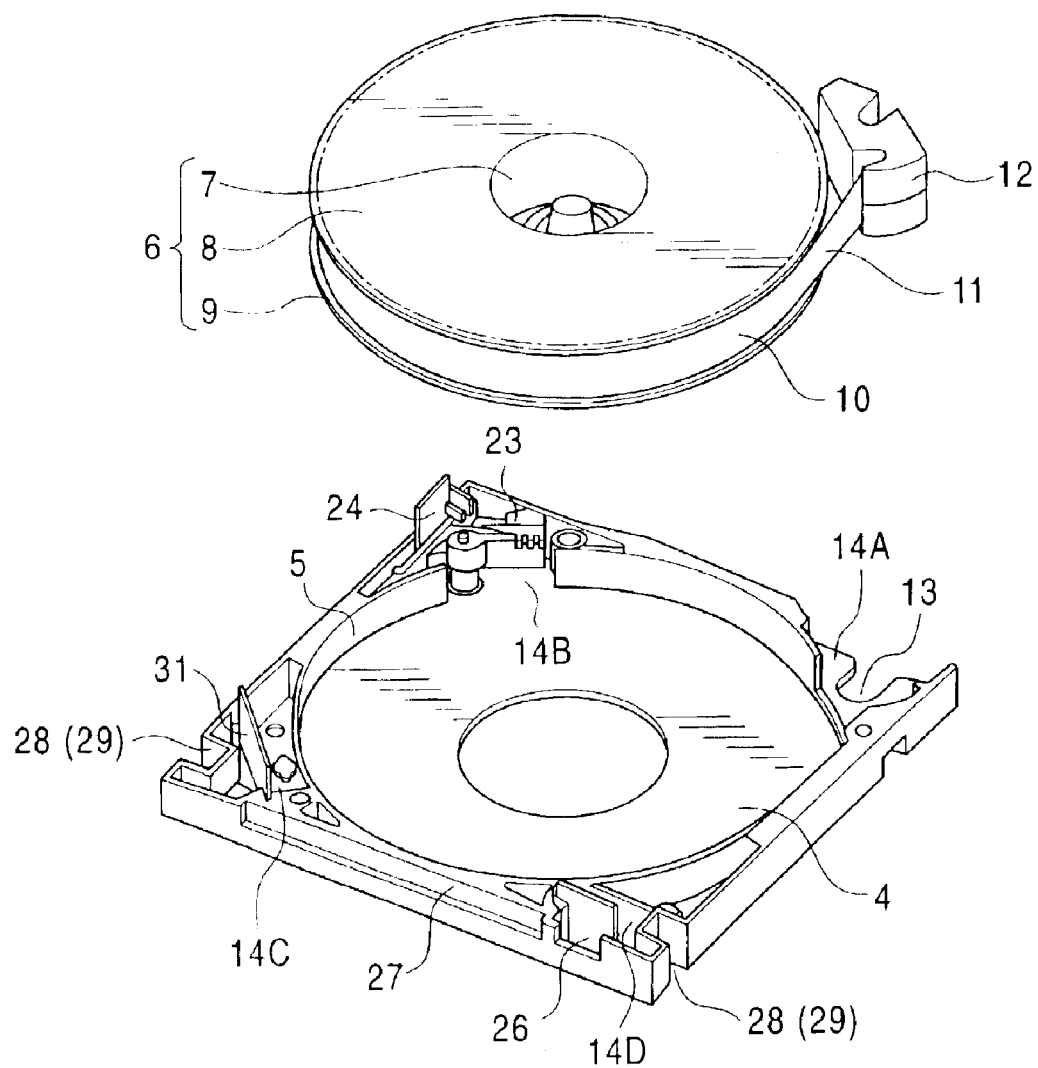
FIG. 9 is an exploded perspective view showing a tape reel and a lower shell of the tape cartridge.

In addition, as shown in FIG. 6, the identification holes 19 used for identifying the medium, the positioning holes 17, the positioning notches 18, and the reel-shaft receiving hole 16 are formed in the bottom surface of the tape cartridge 1.

The identification holes 19 are formed such that the kind of the tape-like recording medium can be determined by detecting the number and positions of the identification holes 19. The tape drive detects the number and the positions of the identification holes 19 by using a detection mechanism such as a microswitch, and determines the kind of the tape-like recording medium, etc.

The positioning holes 17 and the positioning notches 18 serve as references for determining the position of the cartridge 1 in the tape drive when it is loaded in the tape drive. In addition, the reel-shaft receiving hole 16 is used for receiving the reel shaft which becomes engaged with the tape reel 6 and rotates the tape reel 6. The reel shaft is used for rotating the tape reel 6 and thereby rewind the tape-like recording medium 10 extracted out from the cartridge 1 around the tape reel 6. The reel shaft becomes engaged with the hub 7 of the tape reel 6.

The tape cartridge contains the above-described memory module MIC 31, which serves as a memory unit, in the cartridge 1. The memory module MIC 31 stores medium-identification information (Physical Tape Characteristic ID) such as the kind of the tape-like recording medium 10, management information for the information signals recorded on the tape-like recording medium 10, etc.

Alternatively, the medium-identification information and the management information may also be recorded at a predetermined position of the tape-like recording medium 10, for example, on a system area positioned at the beginning of the tape-like recording medium 10 from which the tape-like recording medium 10 is extracted from the tape cartridge 1. In such a case, all kinds of tapes can be identified by using the medium-identification information stored in the MIC 31, the medium-identification information recorded on the system area of the tape-like recording medium 10, and the striped portion 217 formed in the leader tape portion 11 of the tape-like recording medium 10.

The MIC 31 stores the medium-identification information and the management information with a predetermined logic format. This logic format is formed of, for example, a Manufacture Part, a Drive Initialize Part, and Volume Tags. The MIC is preformatted when it is installed in the tape cartridge 1 in accordance with this logic format and, every time the tape cartridge is used in the tape drive, data stored in each area of the MIC is updated if necessary.

More specifically, when the tape cartridge is formatted, tape-format information is recorded in the system area of the MIC as information regarding the magnetic-tape recognition, and the format state of the tape-like recording medium is maintained.

In addition, in order to determine the kind of the tape on the basis of the information read from the MIC, the MIC stores Application ID represented by one-byte data and the medium-identification information (Physical Tape Characteristic ID) represented by two-byte data.

The Application ID defines, for example, an Advanced Metal Evaporated (AME) cartridge (0x00), a Metal Particle (MP) cartridge (0x01), an AME Write-Once, Read-Many (AME WORM) cartridge (0x80), an MP WORM cartridge (0x81), etc.

The medium-identification information (Physical Tape Characteristic ID) representing the kind and characteristics of the tape-like recording medium is constructed of a sixteen-bit data including "Enable Bit" (Bit 15), "Magnetic Layer" (Bit 14), "Applied Read Head" (Bits 13 and 12), "Extension Area Bit" (Bit 11), "Tape Type" (Bits 10, 9, and 8), "Tape Thickness" (Bits 7 and 6), "Tape Length" (Bits 5, 4, 3, 2, 1, and 0).

When the "Enable Bit" (Bit 15) is 1, data items of Bits 14 to 8 are effective in addition to data items of Bits 7 to 0. Conversely, when the "Enable Bit" (Bit 15) is 0, data items of Bits 14 to 8 are not effective and only the data items of Bits 7 to 0 are effective.

When the "Magnetic Layer" (Bit 14) is 0, a magnetic layer of the tape-like recording medium has a single-layer construction, and when the "Magnetic Layer" (Bit 14) is 1, the magnetic layer of the tape-like recording medium has a double-layer construction. By using this one-bit information, various parameters such as parameters of tension control performed by a mechanical control system and other electrical characteristics of the recording/playback system including a current, equalizer characteristics, etc. are set in accordance with the construction of the magnetic layer of the tape-like recording medium.

The "Applied Read Head" (Bits 13 and 12) represents the kind of a read head installed in the tape drive which can be used for the tape-like recording medium. When the tape drive contains a plurality of kinds of read heads, the read head to be used is selected by using this two-bit information. In addition, when the tape drive does not contain a head which is compatible with the tape-like recording medium, the cartridge is ejected from the tape drive.

The "Extension Area Bit" (Bit 11) is usually set to 0, and shows that related information which should be referred to exists at other regions in the MIC when the Extension-Area Bit (Bit 11) is 1.

The "Tape Type" (Bits 10, 9, and 8) represents the most characteristic factor of the tape-like recording medium. By using this three-bit information, various parameters which determine the electrical characteristics of the RF drive, the magnetic heads, etc., of the tape drive is optimally set.

The "Tape Thickness" (Bits 7 and 6) represents the thickness of the tape-like recording medium. By using this three-bit information, various parameters of the mechanical control system of the tape drive are optimally set.

The "Tape Length" (Bits 5, 4, 3, 2, 1, and 0) represents the length of the tape-like recording medium. This six-bit information is used for controlling the remaining amount of the tape-like recording medium around the tape reel, behavior of the tape drive at the end of the tape-like recording medium (tape end) at the hub of the tape reel, etc.

The area for recording the Application ID and the Physical Tape Characteristic ID is in an MIC header in correspondence with the MIC format, and is preformatted in the MIC together with other information stored in the MIC header when the tape cartridge is manufactured.

In this tape cartridge, as described above, the leader tape portion 11 at the beginning of the tape-like recording medium is provided with the striped portion 217. The light-transmission ratio of the striped portion 217 is lower than that of the leader tape portion 11, so that the striped portion 217 can be detected optically in the tape drive.

More specifically, as shown in FIG. 18, an optical source 251 and a light-receiving unit 252 are disposed in the tape drive in such a manner that they oppose each other across the tape-like recording medium 10, which is extracted from the cartridge 1. By determining the amount of light emitted from the optical source 251 and received by the light-receiving unit 252, whether or not the leader tape portion 11 is between the optical source 251 and the light-receiving unit 252 and the number of stripes included in the striped portion 217 can be determined.

The combinations between the kinds of the media and the numbers of stripes are defined in advance. For example, when kinds of formats are defined as "format 1" and "format 2", "format 1, ME" tape may be expressed by zero stripes, "format 2, ME" tape by one stripe, "format 2, MP" tape by two stripes, and "format 1, MP" tape by three stripes. Accordingly, the kind of the medium can be determined by detecting the number of stripes in a manner shown in FIGS. 18 and 19. In this case, even when the data read from the MIC is not effective, the tape mode can be determined as, for example, "format 1, ME" tape when the number of stripes is zero, "format 2, ME" tape when the number of stripes is one, "format 2, MP" tape when the number of stripes is two, "format 1, and MP" tape when the number of stripes is three.

Accordingly, in this tape cartridge, even when the medium-identification information recorded on the MIC and the tape-like recording medium and the identification holes cannot be used, the kind of the tape cartridge can be determined by detecting the number of stripes formed at the striped portion for identifying the medium. Therefore, suitable processing for the tape cartridge can be performed.

In addition, since the tape-like recording medium 10 extracted from the tape cartridge 1 always passes between the optical source 251 and the light-receiving unit 252 in the tape drive, the leader tape portion 11 at the end of the tape-like recording medium 10 can be detected by monitoring the amount of light emitted from the optical source 251 and received by the light-receiving unit 252. Accordingly, the operation of extracting the tape-like recording medium 10 from the tape cartridge 1 is controlled upon the detection of the leader tape portion 11. That is, the extraction operation is stopped and the tape-like recording medium 10 is rewound around the tape reel 6. Since the operation of extracting the tape-like recording medium 10 from the tape cartridge 1 is controlled in this manner, the tape-like recording medium 10 is efficiently utilized from end to end.

In this tape cartridge, one end of the tape-like recording medium 10 is fixed to the hub 7 of the tape reel 6. Therefore, even when the extraction operation does not stop upon detecting the leader tape portion 11B at the end of the tape-like recording medium 10, the tape-like recording medium 10 is prevented from being separated from the tape reel 6 and being pulled out from the tape cartridge 1.

In the recording/playback apparatus (tape drive) shown in FIG. 15, the drum motor, the capstan motor, the take-up reel motor, and the rewinding motor are driven by electric power supplied from the mechanical driver 85. The servo controller 86 controls the mechanical driver 85, which drives each of the driving motors. The servo controller 86 controls the rotational speed of each driving motor so as to control the movement of the tape during normal recording/playback operation, high-speed playback, fast-forward, wind-back, etc.

Although not shown in the figure, the servo controller 86 receives the above-described detection result of whether or not the striped portion 217 is formed on the leader tape portion 11A at the beginning of the tape-like recording medium 10.

In addition, as described above, the tape drive includes the detection mechanism 90 for detecting the identification holes formed in the cartridge hosing of the tape drive and determining whether or not write-protect is set and the result obtained by the hole detection mechanism 90 is also transmitted to the servo controller 86.

Figure 20:
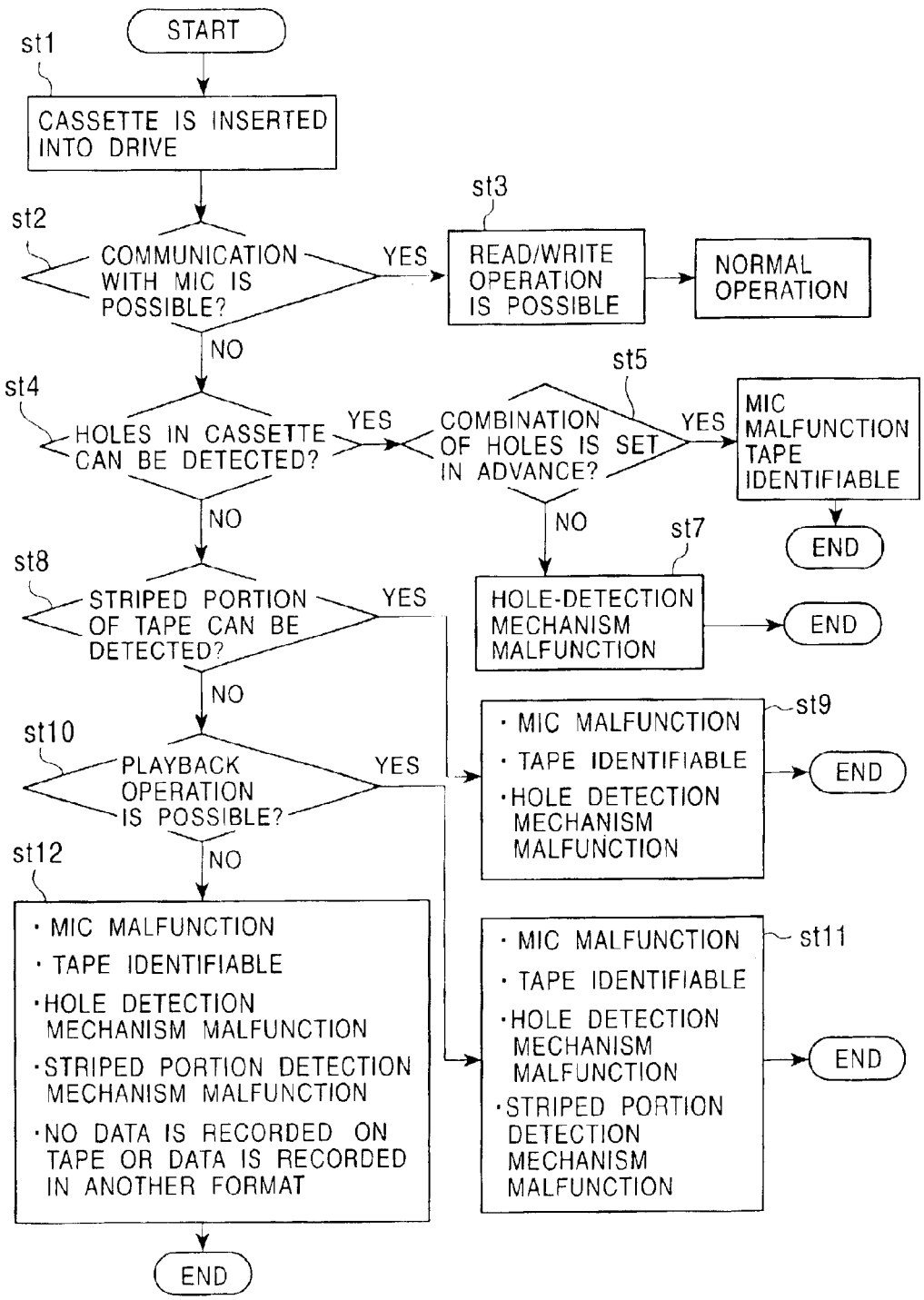
FIG. 20 is a flowchart of a medium identification process performed by the magnetic recording/playback apparatus.

When the tape cartridge is inserted and loaded in the tape drive, the system controller 89 performs a tape-cartridge identification process in accordance with the flowchart shown in FIG. 20.

More specifically, when the tape cartridge is inserted in the tape drive at st1, whether or not communication with the MIC installed in the tape cartridge is possible is determined at st2. When communication with the MIC is possible, the process proceeds to st3 and a normal operation based on information communicated with the MIC is performed. If communication with the MIC is not possible, the process proceeds to st4 and whether or not the identification holes formed in the cartridge can be detected is determined.

When it is determined that the identification holes can be detected at st4, the process proceeds to st5, and whether or not the combination of the number and positions of the identification holes is set in advance is determined. When the combination of the number and positions of the identification holes is set in advance, it is determined that the MIC is malfunctioning at st6 and the process ends. When the combination of the number and positions of the identification holes is not set in advance, it is determined that the identification-hole detection mechanism is malfunctioning at st7 and the process ends.

When it is determined that the identification holes cannot be detected at st4, the process proceeds to st8 and whether or not the striped portion formed at the leader tape portion of the tape-like recording medium can be detected is determined. When the striped portion can be detected, it is determined that the MIC and the identification-hole detection mechanism are malfunctioning at st9 and the process ends. When the striped portion cannot be detected, the process proceeds to st10.

At st10, whether or not the operation of reading and playing back information signals from the tape-like recording medium can be performed is determined. If the operation of reading and playing back information from the tape-like recording medium can be performed, it is determined that the MIC, the identification-hole detection mechanism, and the striped-portion detection mechanism are malfunctioning but the operation of reading information from the tape-like recording medium is possible at st11, and the process ends. When the operation of reading and playing back information signals from the tape-like recording medium cannot be performed, it is determined that the MIC, the identification-hole detection mechanism, and the striped-portion detection mechanism are malfunctioning and the operation of reading information from the tape-like recording medium is not possible at st12, and the process ends. In this case, there is a possibility that no data is recorded on the tape-like recording medium or data is recorded in another format.

Thus, according to this tape drive, when information signals are recorded on the tape-like recording medium but cannot be read properly, they can be prevented from being deleted.

Accordingly, the kind of the medium, etc., can be determined on the basis of the information obtained from the MIC when it is effective, and when the information obtained from the MIC is not effective, the kind of the medium, etc., can be determined on the basis of detection results of the identification holes formed in the cartridge. For example, when kinds of formats are defined as "format 1" and "format 2", cartridges for "format 2" is used for the "format 1, MP"tapes and "format 2, MP" tapes. Since the cartridges for the "format 2" correspond to cartridges for "format 1" whose write-protect holes are always open, when an MP tape is inserted into a tape drive for "format 1", it is decided that the write-protect is set in the "format 1" mode and recording operations are not performed afterwards.

When the kind of the medium, etc., cannot be determined either from the MIC or from the identification holes formed in the cartridge, it is determined by detecting the striped portion of the leader tape portion. For example, when it is determined that the striped portion has two or more stripes in a tape drive for "format 2", recording operations are not performed afterwards.

In addition, when the kind of the medium, etc., cannot be determined from any one of the MIC, the identification holes formed in the cartridge, and the striped portion, the information signals are read out from the tape-like recording medium. When the information signals can be read out from the tape-like recording medium, the kind of the medium, etc., are determined on the basis of the thus obtained information signals. When the information signals cannot be read from the tape-like recording medium, recording operations are not performed afterwards.

Figure 21:
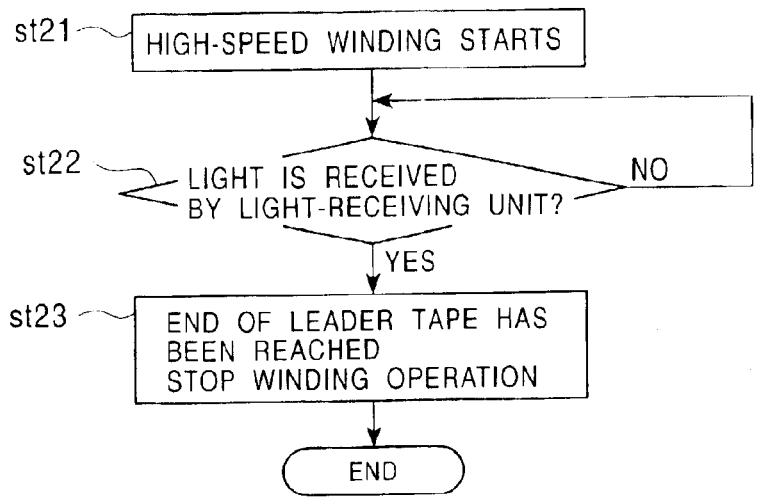
FIG. 21 is a flowchart of a tape-winding process performed by the magnetic recording/playback apparatus.

In addition, in the case in which the tape-like recording medium is wound around the take-up reel from the beginning to the end of the tape-like recording medium at high speed, a control process is performed in accordance with the flowchart shown in FIG. 21. More specifically, when a high-speed winding starts at st21, the process proceeds to st22 and whether or not the light emitted from the light source is received by the light-receiving unit is determined while the tape-like recording medium is passing between the light source and the light-receiving unit. When the light emitted from the light source is not received by the light-receiving unit, the process does not proceed from st22, and when the light emitted from the light source is received by the light-receiving unit, the process proceeds to st23. At st23, it is determined that the leader tape portion at the end of the tape-like recording medium is separated from the tape reel, and the operation of winding the tape around the take-up reel is stopped. Accordingly, the process ends.

Figure 22:
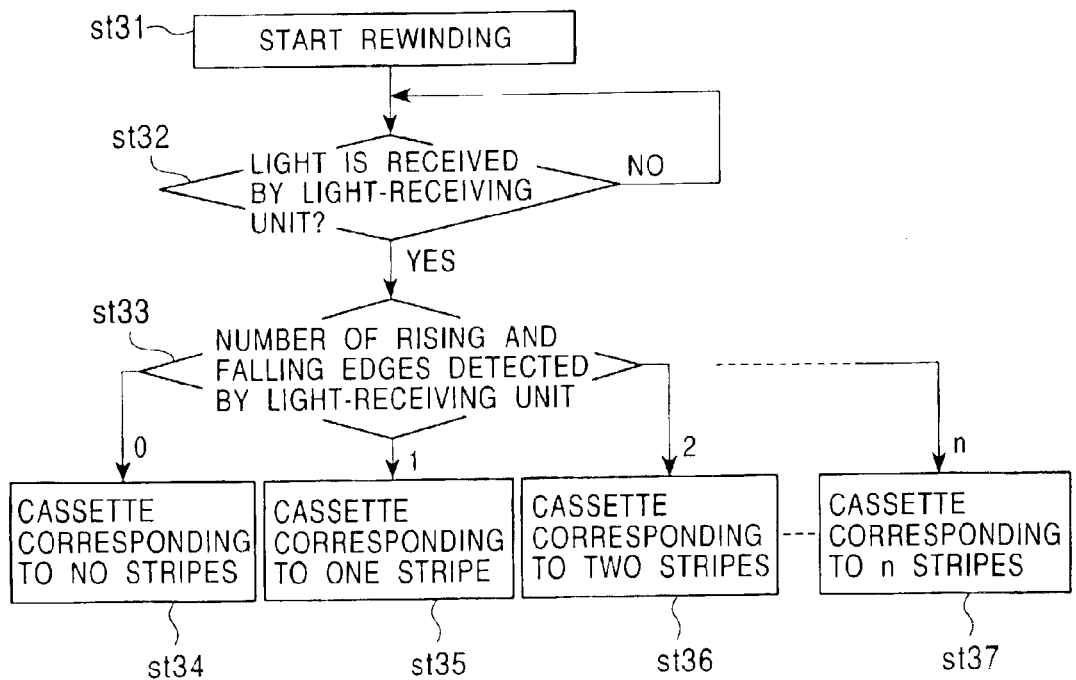
FIG. 22 is a flowchart of a tape-rewinding process performed by the magnetic recording/playback apparatus.

In addition, in the case in which the tape-like recording medium is rewound around the tape reel from the end to the beginning of the tape-like recording medium at high speed, a control process according to the flowchart shown in FIG. 22 is performed. More specifically, when a high-speed rewinding starts at st31, the process proceeds to st32 and whether or not the light emitted from the light source is received by the light-receiving unit is determined while the tape-like recording medium is passing between the light source and the light-receiving unit. When the light emitted from the light source is not received by the light-receiving unit, the process does not proceed from st32, and when the light emitted from the light source is received by the light-receiving unit, the process proceeds to st33. At st33, the number of rising and falling edges of a light-detection signal obtained from the light-receiving unit is counted during a predetermined time interval, and the number of stripes formed in the striped portion is determined on the basis of the counted number. When the number of stripes is zero, it is determined that the tape cartridge is defined in combination with no stripes at st34 and the process ends. When the number of stripes is one, it is determined that the tape cartridge is defined in combination with one stripe at st35 and the process ends. When the number of stripes is two, it is determined that the tape cartridge is defined in combination with two stripes at st36 and the process ends. When the number of stripes is n, it is determined that the tape cartridge is defined in combination with n stripes at st37 and the process ends.

(5) Explanations of the Leader Block of the Single-reel Tape Cartridge and the Recording/playback Apparatus Next, the leader block used for extracting the tape will be described below with reference to FIGS. 23 to 36.

Figure 23:
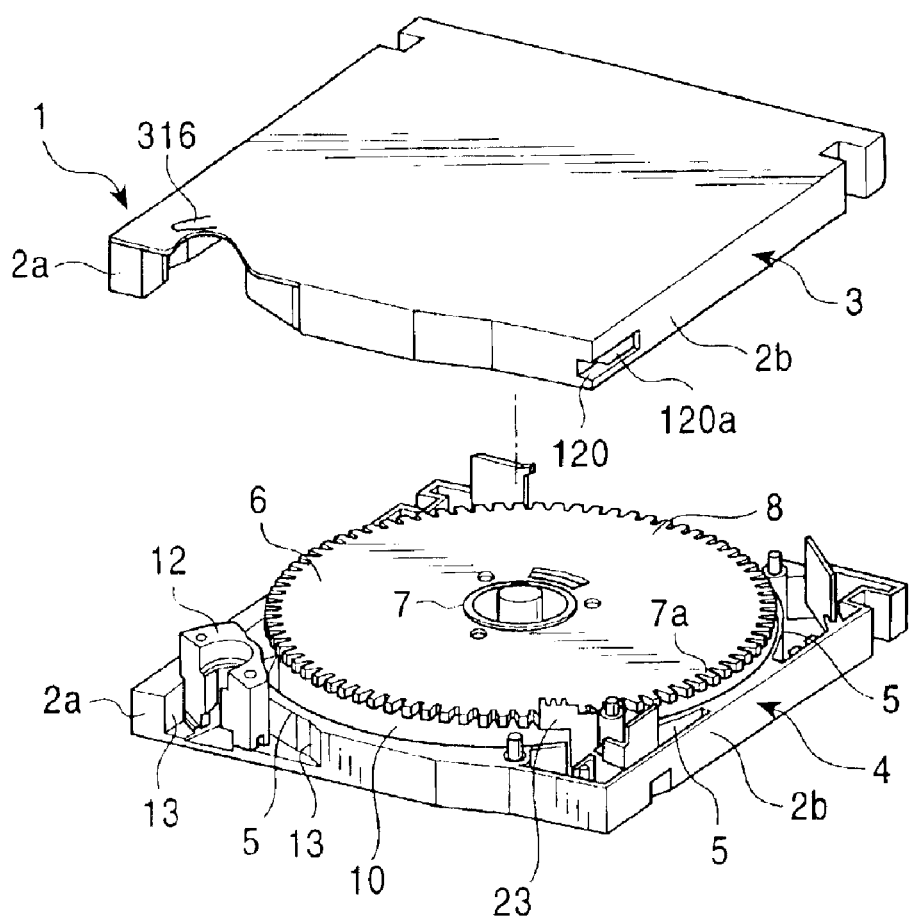
FIG. 23 is an exploded perspective view of the tape cartridge as seen from a tape-passage hole.

As shown in FIG. 23, the tape-passage hole 13, through which the tape-like recording medium 10 is extracted, is formed at the anterior side 2a. The tape-passage hole 13 is formed by forming notches in the upper-half member 3 and the lower-half member 4 at one end of the anterior side 2a, which is the front side in the direction in which the tape cartridge 1 is inserted in the recording/playback apparatus, and combining them. The leader block 12, in which the second end of the tape-like recording medium 10 is clamped, is restrained in the tape-passage hole 13 in such a manner that the leader block 12 faces outward.

Figure 28:
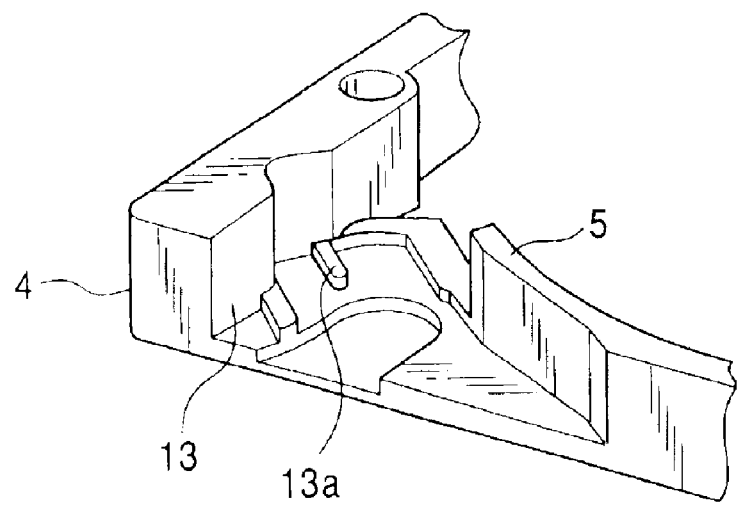
FIG. 28 is a perspective view showing a positioning projection formed on a lower half member.

As shown in FIG. 28, the tape-passage hole 13 is provided with a positioning projection 13a, which is formed on the lower-half member 4 and which is used for guiding and positioning the leader block 12 when the leader block 12 is inserted inside the cartridge housing 2. The positioning projection 13a extends in the direction in which the leader block 12 is inserted and extracted, and is formed such that the end thereof is pointed in the letter 'V' shape. When the leader block 12 is inserted into the tape-passage hole 13, the positioning projection 13a is inserted in a positioning groove 353 formed in the leader block 12, and the end thereof having the letter 'V'0 shape contacts the bottom of the positioning groove 353, which is also formed in the letter 'V' shape. Accordingly, the positioning projection 13a serves to guide the insertion of the leader block 12 into the cartridge housing 2 and positions the leader block 12 inside the cartridge housing 2.

Figure 29:
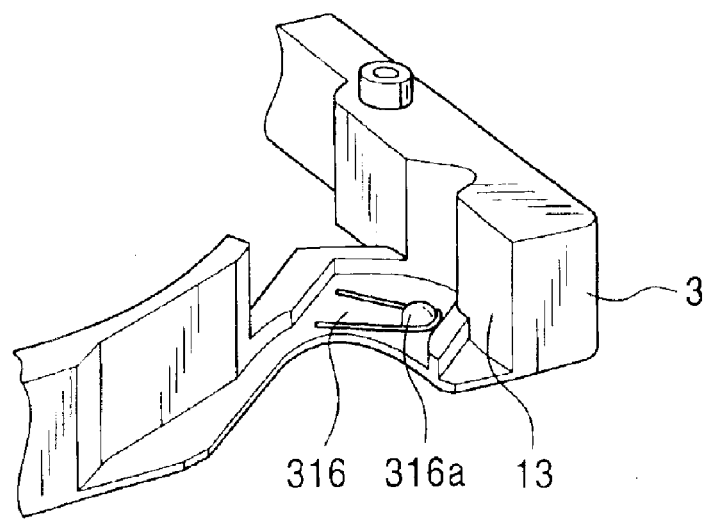
FIG. 29 is a perspective view showing a restraining projection formed on an upper half member.

In addition, as shown in FIG. 29, the tape-passage hole 13 is provided with a leader-block pressing member 316, which is formed on the upper-half member. The leader-block pressing member 316 includes a restraining projection 316a which extends toward the lower-half member and which becomes engaged with a restraining recess 355 formed in the top surface of the leader block 12 when the leader block 12 is installed in the cartridge housing 2. When the leader block 12 is inserted in the cartridge housing 2 through the tape-passage hole 13, the leader-block pressing member 316 deforms elastically and the restraining projection 316a becomes engaged with the restraining recess 355 formed in the leader block 12. Accordingly, the leader block 12 is positioned inside the cartridge housing 2 and rattling of the leader block 12 is prevented. In order to make the insertion/extraction of the leader block 12 smooth, a predetermined amount of clearance is provided between the positioning groove 353 formed in the bottom surface of the leader block 12 and the positioning projection 13a formed on the lower-half member 4. However, when the restraining projection 316a formed on the leader-block pressing member 316 becomes engaged with the restraining recess 355 and presses the leader block 12, rattling of the leader block 12 due to the clearance between the positioning groove 353 and the positioning projection 13a is prevented.

Figure 30:
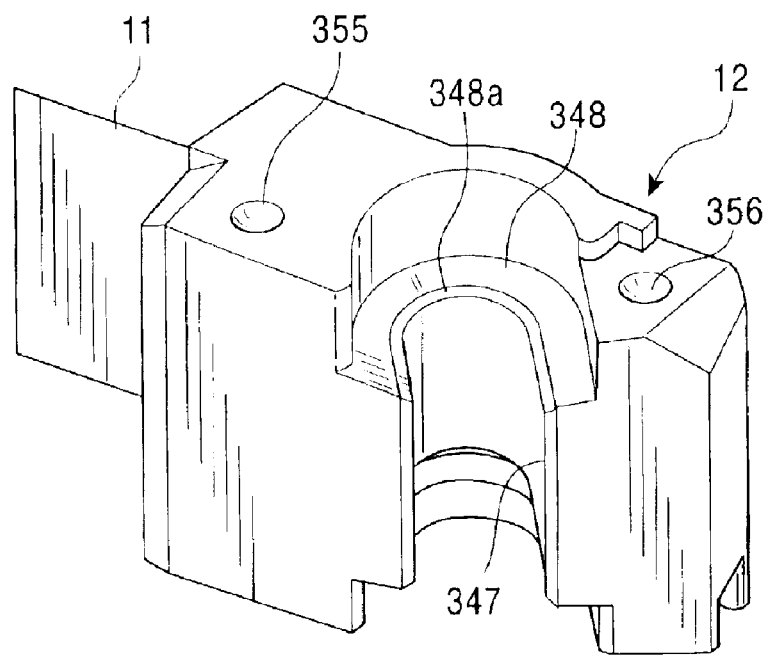
FIG. 30 is a perspective view showing the upper side of a leader block.
Figure 31:
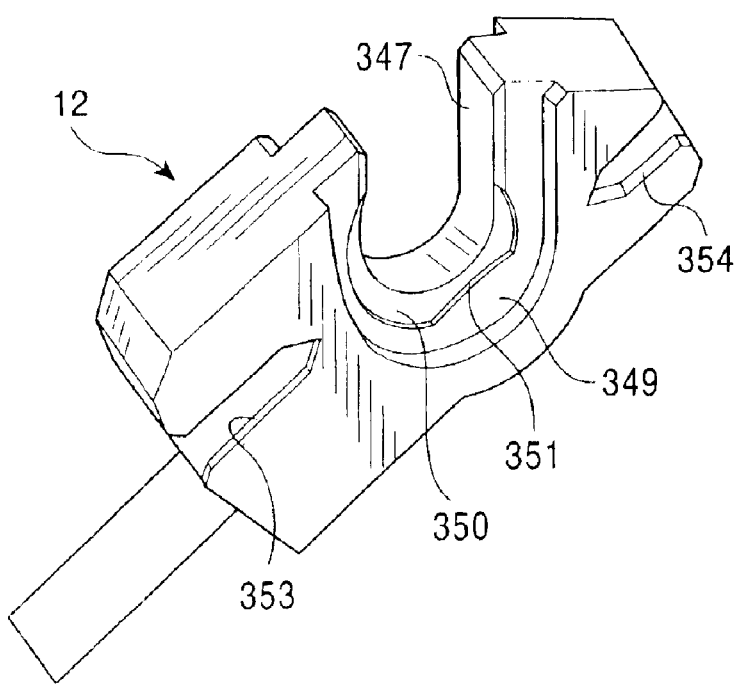
FIG. 31 is a perspective view showing the lower side of the leader block.

In addition, as is understood from FIGS. 30 and 31, the leader block 12 includes an engaging portion 347 in which a sleeve of a tape-extracting member installed in the apparatus and an engaging shaft which projects downward from the sleeve member are inserted, an upper engaging step 348 which is formed at the upper side of the engaging portion 347 and which becomes engaged with the bottom surface of the sleeve, and a lower engaging step 349 which is formed at the lower side of the engaging portion 347 and which becomes engaged with a flange of the engaging shaft.

As shown in FIGS. 30 and 31, the engaging portion 347 and the upper and lower engaging steps 348 and 349 are formed in the letter 'C' shape at parts which receive the engaging shaft and the bottom surface of the sleeve of the tape-extracting member. The leader block 12 becomes engaged with the tape-extracting member by receiving the engaging shaft at the engaging portion 347 and the upper and lower engaging steps 348 and 349. Accordingly, the leader block 12 is positioned while it is being engaged with the tape-extracting member, and rotation and rattling of the leader block 12 while being transferred are prevented.

The upper engaging step 348 is provided with a positioning portion 348a corresponding to the flange formed on the engaging shaft. The positioning portion 348a is formed as an inclined surface between the upper engaging step 348 and the engaging portion 347. When the leader block 12 becomes engaged with the tape-extracting member, the positioning portion 348a comes into contact with the flange formed on the engaging shaft. Accordingly, the leader block 12 is reliably engaged with the engaging shaft.

In addition, the leader block 12 is provided with a positioning step 350 at a position between the engaging portion 347 and the lower engaging step 349, and an inclined surface of the flange formed on the engaging shaft comes into contact with the positioning step 350. The positioning step 350 is also formed in the letter 'C' shape at an abutting portion thereof, and a rotation-restraining portion 351 which has a shape corresponding to that of a beveled portion formed in the flange of the engaging shaft and which restrains the rotation of the leader block 12 is formed at a part of the abutting portion. As shown in FIG. 31, the rotation-restraining portion 351 is formed in a chord-like shape in a part of the abutting portion having a bow-like shape. The rotation-restraining portion 351 comes into contact with the beveled portion which is formed in the flange of the engaging shaft and which also have a chord-like shape. Accordingly, the leader block 12 is positioned while it is being engaged with the tape-extracting member, and rotation and rattling of the leader block 12 while being transferred are prevented.

In addition, as shown in FIG. 31, the leader block 12 is provided with positioning grooves 353 and 354, which are used for positioning the leader block 12 when it is restrained in the cartridge housing 2 and in the recording/playback apparatus, respectively, at both ends of the bottom surface. The positioning grooves 353 and 354 receive the positioning projection 13a formed in the cartridge housing 2 and a positioning projection 371 formed in the take-up reel, respectively, and serve to guide and position the leader block 12 when the leader block 12 is inserted inside the cartridge housing 2 and the take-up reel. The positioning groove 353 is formed in a bracket shape in the bottom surface of the leader block 12 in such a manner that the positioning groove 353 extends from a central position of the rear side of the leader block 12 to a position close to the lower engaging step 349. The width of the positioning groove 353 is increased toward the open end formed at the rear side of the leader block 12, and the other end of the positioning groove 353 is formed in the letter 'V' shape. The positioning groove 354 is formed in a bracket shape in the bottom surface of the leader block 12 in such a manner that the positioning groove 354 extends from a central position of the front side of the leader block 12 to a position close to the lower engaging step 349. Similarly to the positioning groove 353, the width of the positioning groove 354 is increased toward the open end and the other end is formed in the letter 'V' shape. Accordingly, the positioning projections 13a and 371 are smoothly inserted into the positioning grooves 353 and 354, respectively, from the open ends where the widths are increased, and the positioning grooves 353 and 354 are able to reliably position the leader block 12 by receiving the pointed ends of the positioning projections 13a and 371 by the end portions formed in the letter 'V' shape.

In addition, as shown in FIG. 30, the leader block 12 is provided with restraining recesses 355 and 356, which are used for positioning the leader block 12 when it is restrained in the cartridge housing 2 and in the recording/playback apparatus, respectively, at the top surface thereof. When the leader block 12 is restrained inside the cartridge housing 2, the restraining recess 355 formed at the rear end of the leader block 12 is engaged with the restraining projection 316a shown in FIG. 29, which is pressed by the leader-block pressing member 316 formed on the top surface of the tape-passage hole 13 in the cartridge housing 2. Accordingly, the leader block 12 is positioned inside the cartridge housing 2 and rattling thereof is prevented. In addition, when the leader block 14 is disposed inside the take-up reel, the restraining recess 356 formed at the front end of the leader block 12 is engaged with a retaining projection 374, which is pressed by a leader-block pressing member 373 formed in the take-up reel. Accordingly, the leader block 12 is positioned inside the take-up reel and rattling thereof is prevented.

Next, the recording/playback apparatus which receives the tape cartridge 1 and the operations of loading and unloading the tape-like recording medium will be described below.

Figure 33:
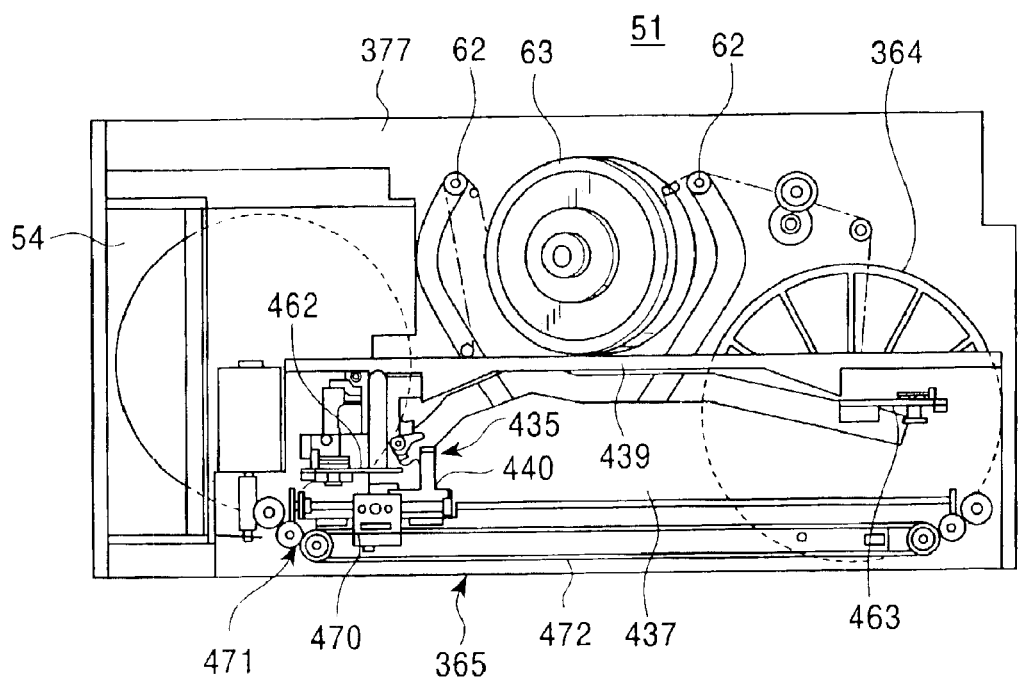
FIG. 33 is a plan view of a main part of the recording/playback apparatus according to the present invention.

As shown in FIG. 33, the recording/playback apparatus 51 is constructed as a recording/playback apparatus for a single-reel tape cartridge. The magnetic recording/playback apparatus 51 includes a cartridge-receiving mechanism 54 into which the tape cartridge 1 is inserted, a rotating magnetic head device 63 which comes into contact with the tape-like recording medium 10 wound around the tape cartridge 1 and performs information recording/playback operation, a take-up reel 364 which forms a tape-winding mechanism for winding the tape-like recording medium 10 transferred into the apparatus, and a transferring mechanism 365 which becomes engaged with the leader block 12 attached to the tape-like recording medium 10 at the end thereof and which transfers the leader block 12 between the cartridge housing 2 and the take-up reel 364.

In the recording/playback apparatus 51, the take-up reel 364 and the cartridge-receiving mechanism 54 opposes each other across the rotating magnetic head device 63 on a base plate 377. The recording/playback apparatus 51 performs information recording/playback operation by bringing the tape-like recording medium 10 into contact with the rotating magnetic head device 63 in the letter 'M' shape while the tape-like recording medium 10 is being transferred from the tape cartridge 1 to the take-up reel 364.

Figure 34:
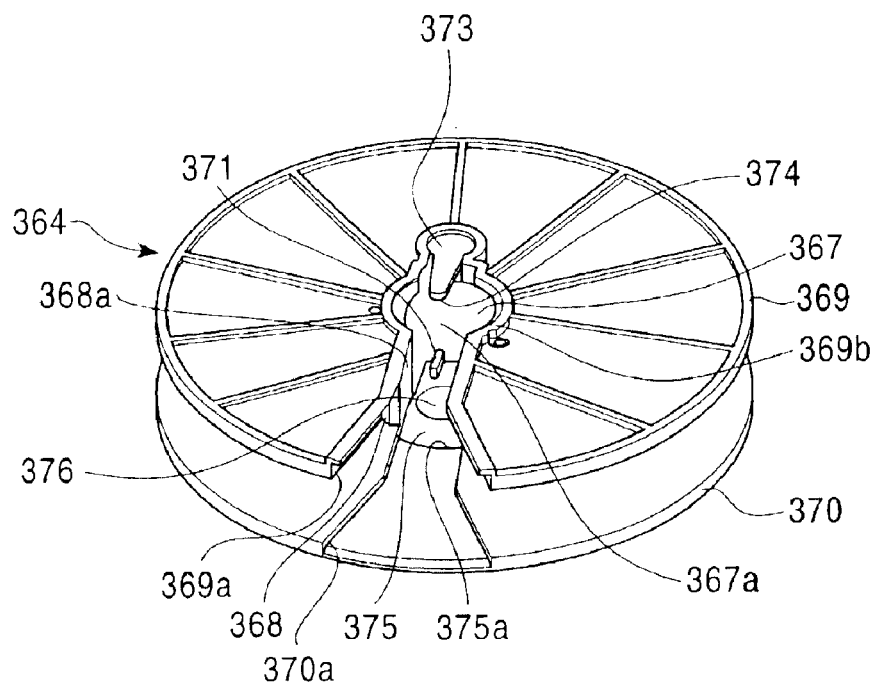
FIG. 34 is a perspective view of an overall body of a take-up reel.

As shown in FIG. 34, the take-up reel 364, which winds the tape-like recording medium transferred inside the recording/playback apparatus 51, includes a reel hub 368 having a leader-block retainer 367 for receiving and retaining the leader block 12 and a pair of reel flanges 369 and 370 formed at the upper and lower ends of the reel hub.

The leader-block retainer 367, which receives the leader block 12, includes an open-end 368a which is formed as an opening formed at a part of the reel hub 368 and a storing portion 367a which is formed continuously from the open-end 368a and which stores and retains the leader block 12. The positioning projection 371 for guiding the insertion of the leader block 12 is formed inside the storing portion 367a at the side at which the front side of the leader block 12 comes into contact with the storing portion 367a. When the leader block 12 is inserted through the open-end 368a, the positioning projection 371 is inserted into the positioning groove 354 formed in bottom surface of the leader block 12 at the front end thereof. Accordingly, the leader block 12 is guided by the positioning projection 371 and is smoothly inserted into the leader-block retainer 367.

The reel flanges 369 and 370 are attached to the reel hub 368 at the upper and lower ends thereof, and serve to align the windings of the tape-like recording medium 10 extracted by the tape-extracting mechanism and wound around the reel hub 368. The reel flanges 369 and 370 are formed continuously with the open-end 368a of the reel hub 368, and are provided with guiding grooves 369a and 370a, respectively, which are used for guiding the leader block 12 toward the leader-block retainer 367. The guiding grooves 369a and 370a are formed by partly removing the reel flanges 369 and 370 from the periphery toward the center, and the leader block 12 is transferred into the leader-block retainer 367 through the guiding grooves 369a and 370a by the transferring mechanism 365. The guiding grooves 369a and 370a are formed such that the widths thereof are increased from the center toward the periphery of the reel flanges 369 and 370, so that the leader block 12 is smoothly carried through the guiding grooves 369a and 370a and is easily positioned relative to the take-up reel 364.

Figure 35:
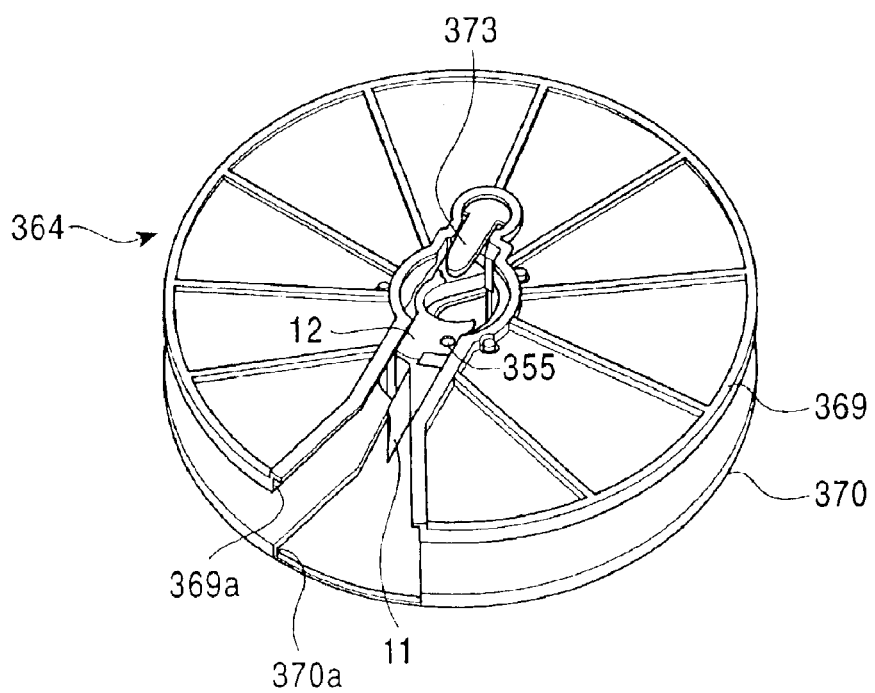
FIG. 35 is a perspective view showing a manner in which the leader block is inserted into the take-up reel.

The upper flange 369 is provided with a circular opening 369b at the center thereof, the circular opening 369b being formed such that the top surface of the leader block 12 faces toward the outside. In addition, the leader-block pressing member 373 having elasticity projects above the opening 369b at the upper side of the leader block 12, and the retaining projection 374 is formed at the end of the leader-block pressing member 373, the retaining projection 374 facing the leader block 12. When the leader block 12 is inserted in the leader-block retainer 367, the leader-block pressing member 373 deforms elastically and the restraining projection 374 becomes engaged with the restraining recess 356 formed in the top surface of the leader block 12, as shown in FIG. 35. Accordingly, the retaining projection 374 serves to position the leader block 12 stored inside the leader-block retainer 367, so that rattling of the leader block 12 is prevented. In order to make the insertion/extraction of the leader block 12 smooth, a predetermined amount of clearance is provided between the positioning groove 354 formed in the bottom surface of the leader block 12 and the positioning projection 371 formed in the leader-block retainer 367. However, when the restraining projection 374 formed on the leader-block pressing member 373 becomes engaged with the restraining recess 356 and presses the leader block 12, rattling of the leader block 12 due to the clearance between the positioning groove 354 and the positioning projection 371 can be prevented.

In addition, the lower flange 370 is provided with a restraining portion 375 for restraining the leader block 12 at the center thereof. When the leader block 12 is inserted inside the leader-block retainer 367 and pressed by the above-described retaining projection 374, the leader block 12 is disposed inside the restraining portion 375. Accordingly, even when the leader block 12 is released from the engaging shaft of the tape-extracting member, it is restrained by a restraining step 375a, which is a recess formed in the bottom surface of the restraining portion 375. In addition, even when the leader block 12 is pulled in a direction such that the leader block 12 is released from the take-up reel 364 due to the back-tension of the tape-like recording medium 10, it can be prevented from being separated from the leader-block retainer 367.

In addition, the restraining portion 375 is also provided with a hole 376, and an engaging shaft 452 of a tape-extracting member 450, which becomes engaged with the leader block 12 and pulls out the leader block 12 out from the cartridge housing 2, is removed from the leader block 12 through the hole 376 after the leader block 12 is disposed inside the take-up reel 364.

When the leader block 12, which is engaged with the engaging shaft of the tape-extracting member, is transferred by the transferring mechanism to the take-up reel 364 which is constructed as described above, the leader block 12 is inserted into the guiding grooves 369a and 370a, which are rotated in advance such that the guiding grooves 369a and 370a faces the leader block 12.

Then, when leader block 12 is guided by the guiding grooves 369a and 370a and enters the leader-block retainer 367, the positioning projection 371 formed in the storing portion 367a guides the insertion of the leader block 12 into the storing portion by being inserted in the positioning groove 354 formed in the leader block 12. In addition, the restraining projection of the leader-block pressing member 373 formed on the upper flange 369 becomes engaged with the restraining recess 356 of the leader block 12, so that rattling of the leader block 12 is prevented. At this time, the leader block 12 is released from the engaging shaft of the tape-extracting member. However, since the leader block 12 is pressed by the retaining projection 374 of the leader-block pressing member 373 and restrained by the restraining step 375a of the restraining portion 375, the leader block 12 is prevented from being separated from the take-up reel 364 due to the back-tension of the tape-like recording medium 10 wound around the tape reel 6 disposed inside the cartridge housing 2. Then, the take-up reel 364 is rotated by a driving mechanism (not shown), and winds the tape-like recording medium 10.

Next, the transferring mechanism used for transferring the tape-like recording medium 10 wound around inside the tape cartridge 1 loaded in the above-described cartridge-receiving mechanism 54 will be described below.

The transferring mechanism 365 becomes engaged with the leader block 12 attached to the end of the tape-like recording medium 10 and transfers the leader block 12 between the cartridge housing 2 and the take-up reel 364. As shown in FIG. 33, the transferring mechanism 365 includes a transferring unit 435 which is disposed on a plate 437 and which becomes engaged with the leader block 12 attached at the end of the tape-like recording medium 10 stored in the tape cartridge 1 and transfers the leader block 12 between the tape cartridge 1 and the take-up reel 364, and chucking mechanisms 462 and 463 which engage and disengage the leader block 12 and the tape-extracting member 450 in association with the movement of the transferring unit 435.

Figure 36:
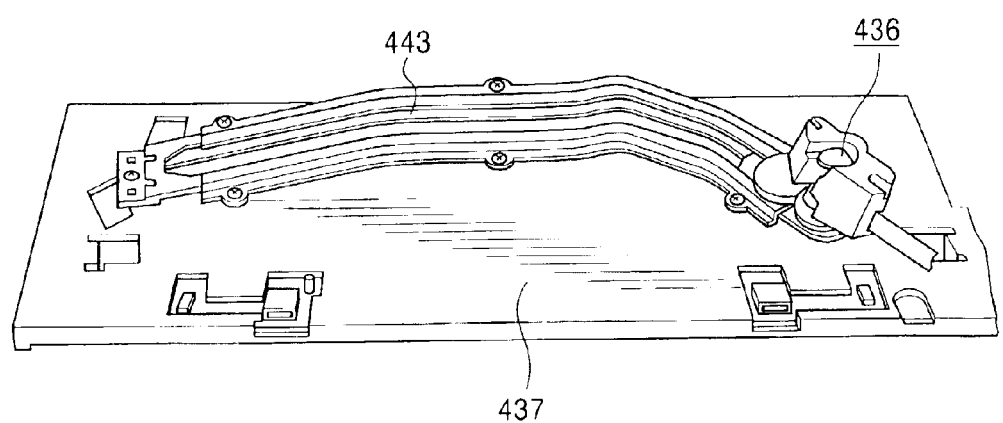
FIG. 36 is a perspective view showing the lower side of a plate on which a tape-transferring mechanism is mounted.

As shown in FIGS. 33 and 36, the plate 437, on which the transferring mechanism 365 is disposed, has a flat, rectangular shape and is provided with a cam groove 443 along which the tape-extracting member 450 is engaged with the leader block 12 is moved and a guiding concavity 439 for guiding the transferring unit 435 which transfers the tape-extracting member 450.

This moving mechanism 440 is connected to a timing belt 472 of a driving mechanism 471 by a supporting member 470. The moving mechanism 440 is moved between the cartridge-receiving mechanism 54 and the take-up reel 364 by driving the timing belt 172 of the driving mechanism 471.

Figure 32:
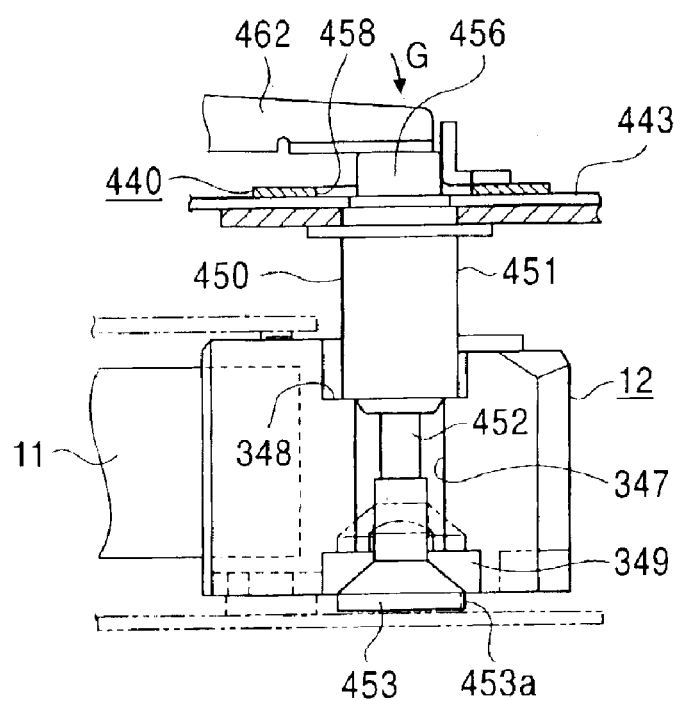
FIG. 32 is a sectional view showing a manner in which the engaging shaft becomes engaged with the leader block.

As shown in FIG. 32, when a pressing member 456 is pressed down, the tape-extracting member 450 extends downward so that it becomes possible to insert the tape-extracting member 450 into the engaging portion 347 of the leader block 12. After the tape-extracting member 450 is inserted into the engaging portion 347, the engaging shaft 452 moves upward as the pressing member 456 returns to its original position by an elastic restoring force, so that a flange 453 becomes engaged with the positioning step 350 of the leader block 12. Accordingly, the engaging shaft 452 becomes engaged with the leader block 12. At this time, a beveled portion 453a formed in the flange 453 of the engaging shaft 452 is in contact with the rotation-restraining portion 351 formed in the positioning step 350. Accordingly, the leader block 12 is positioned relative to the tape-extracting member 450 and is prevented from rotating freely or being disengaged from the tape-extracting member 450 while it is being transferred.

The tape-extracting member 450 is inserted into a guide groove 458 of the moving mechanism 440 and moves between the cartridge-receiving mechanism 54 and the take-up reel 364 along the cam groove 443 along with moving mechanism 440.

When the moving mechanism 440 is moved to the take-up reel 364 and the leader block 12 is guided to the center of the take-up reel 364, the tape-extracting member 450 is released from the leader block 12 by a disengaging lever 463.

At this time, the positioning projection 371 formed in the storing portion 367a is inserted into the positioning groove 354 of the leader block 12, so that the leader block 12 is guided into the leader-block retainer 367. In addition, since the end of the positioning groove 354 has the letter 'V' shape similarly to the positioning projection 371, the positioning groove 354 and the positioning projection 371 are engaged with each other, so that the leader block 12 is positioned.

In addition, the leader-block pressing member 373 which projects above the opening 369b formed in the upper reel flange 369 deforms elastically such that the retaining projection 374 formed at the end of the leader-block pressing member 373 becomes engaged with the restraining recess 356 formed in the leader block 12. Accordingly, the leader block 12 is pressed by the retaining projection 374, and rattling of the leader block 12 in the leader-block retainer 367 is prevented. In addition, the lower end of the leader block 12 is restrained by the restraining step 375a of the restraining portion 375 formed at the center of the lower flange 370. Accordingly, the leader block 12 is prevented from being separated from the take-up reel 364 due to the back-tension of the tape-like recording medium 10.

Then, the tape-like recording medium 10, which extends between the tape cartridge 1 and the take-up reel 364, is guided by the loading pins 62, which is disposed at both sides of the rotating magnetic head device 63 in a movable manner, and is brought into contact with the rotating magnetic head device 63 in the letter 'M' shape.

Also when the tape-like recording medium 10 is rewound, the leader block 12 becomes engaged with the tape-extracting member 450 and is moved along with the moving mechanism 440 toward the cartridge housing 2 in a similar manner.

When the leader block 12 is inserted into the cartridge housing 2, the positioning projection 13a is inserted in the positioning groove 353 so as to guide the insertion of the leader block 12 into the cartridge housing 2. In addition, since the end of the positioning groove 353 has the letter 'V' shape similarly to the positioning projection 13a, the positioning groove 353 and the positioning projection 13a are engaged with each other, so that the leader block 12 is positioned.

In addition, the leader-block pressing member 316 formed on the upper-half member 3 deforms elastically such that the restraining projection 316a formed at the end of the leader-block pressing member 316 becomes engaged with the restraining recess 355 formed in the top surface of the leader block 12. Accordingly, the leader block 12 is pressed by the restraining projection 316a, and rattling of the leader block 12 in the cartridge housing 2 is prevented.

Accordingly, the tape cartridge and recording/playback apparatus in which the present invention is applied is explained in the foregoing descriptions. However, the preset invention is not limited to the case in which restraining recesses are formed in the top surface of the leader block and restraining projections corresponding to the restraining recesses are formed in the take-up reel and in the cartridge housing. The construction may also be such that restraining projections are formed on the top surface of the leader block and restraining recesses corresponding to the restraining projections are formed in the take-up reel and in the cartridge housing.

In addition, the present invention is not limited to the case in which positioning grooves are formed in the bottom surface of the leader block and positioning projections corresponding to the positioning grooves are formed on the leader block or and the cartridge housing. The construction may also be such that positioning projections are formed on the bottom surface of the leader block and positioning grooves corresponding to the positioning projections are formed in the take-up reel and in the cartridge housing.

(6) Explanations of the Reel Lock of the Single-reel Tape Cartridge, the Reel Lock Disengaging Member, and the Recording/playback Apparatus As shown in FIG. 23, the tape cartridge 1, to which the present invention is applied, includes the cartridge housing 2 formed by combining the upper-half and lower-half members 3 and 4, the tape reel 6 which is installed in the cartridge housing 2 and around which the tape-like recording medium 10 is wound, and the reel lock 23 which prevents the tape reel 6 from rotating freely when the tape cartridge 1 is not loaded in the recording/playback apparatus.

When the tape cartridge 1 is inserted in the recording/playback apparatus, the tape reel 6 is released from the reel lock 23. The leader block 12 attached to the tape-like recording medium 10 is extracted by the tape-extracting mechanism of the recording/playback apparatus and guided to the take-up reel, and the tape-like recording medium 10 is transferred by being wound around the take-up reel.

Figure 24:
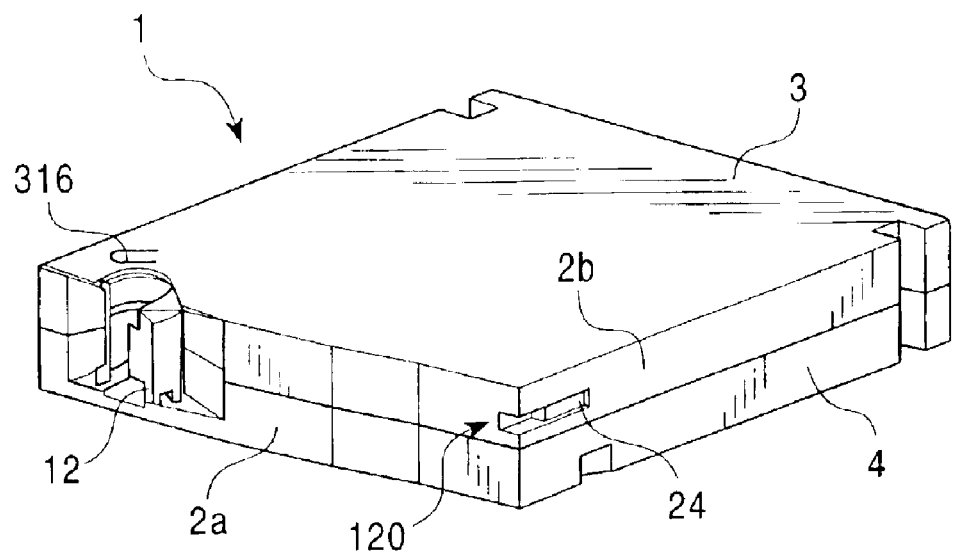
FIG. 24 is a perspective view showing the upper side of the tape cartridge.
Figure 25:
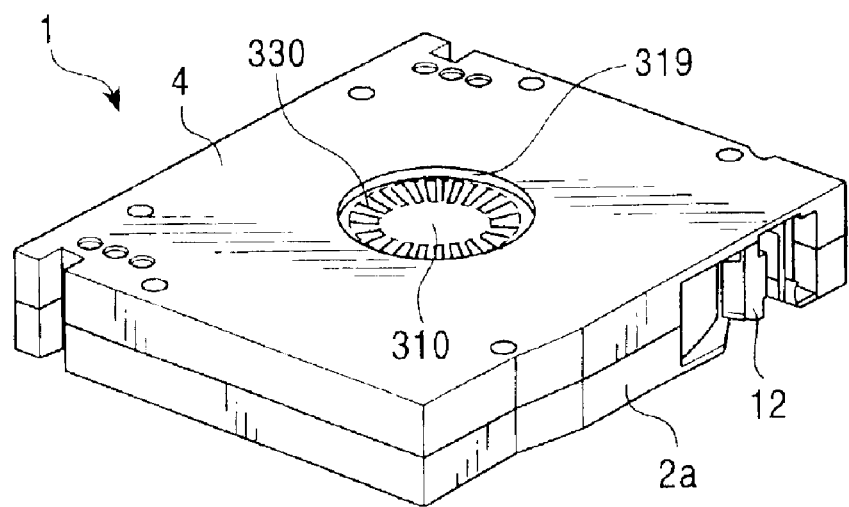
FIG. 25 is a perspective view showing the lower side of the tape cartridge.

As shown in FIGS. 23, 24, and 25, the upper-half and lower-half members 3 and 4 are formed in a rectangular shape by injection molding using a synthetic resin such as acrylonitrile-butadiene-atyrene (ABS) resin, etc. In addition, the upper-half and lower-half members 3 and 4 are formed large enough so that the tape reel 6, around which the tape-like recording medium 10 is wound, can be rotatably stored when the upper-half and lower-half members 3 and 4 are combined so as to form the cartridge housing 2. The upper-half and lower-half members 3 and 4 are provided with side walls 2a, 2b, 2c, and 2d which form outside walls when the upper-half and lower-half members 3 and 4 are combined together so as to form the cartridge housing 2. In addition, the upper-half and lower-half members 3 and 4 are also provided with an arc-shaped partition walls 5 which form partition walls when the upper-half and lower-half members 3 and 4 are combined together. When the cartridge housing 2 is formed by combining the upper-half and lower-half members 3 and 4, a tape-reel receiver for storing the tape reel 6 is formed in the cartridge housing 2 by the outside walls 2a to 2d and the partition walls 5.

In addition, the reel lock disengaging member receiving groove 120 is formed in the side wall b of the cartridge housing 2 from one end of the side wall 2a, which is at the front side in the direction in which the tape cartridge 1 is inserted into the recording/playback apparatus. The reel lock disengaging member receiving groove 120 receives a reel lock disengaging member 317, which is disposed inside the recording/playback apparatus. The reel lock disengaging member receiving groove 120 is formed by cutting out a part of the side wall 2b of the upper-half member 3 or the lower-half member 4 in a bracket shape in such a manner that the reel lock disengaging member receiving groove 120 has an open end at the front side in the direction in which the tape cartridge 1 is inserted into the recording/playback apparatus. In addition, the reel lock disengaging member receiving groove 120 has a rectangular opening at the bottom side thereof, the opening serving as a shutter receiving hole 120a which receives the shutter 24, which will be described below, in such a manner that the shutter 24 is able to move.

Figure 26:
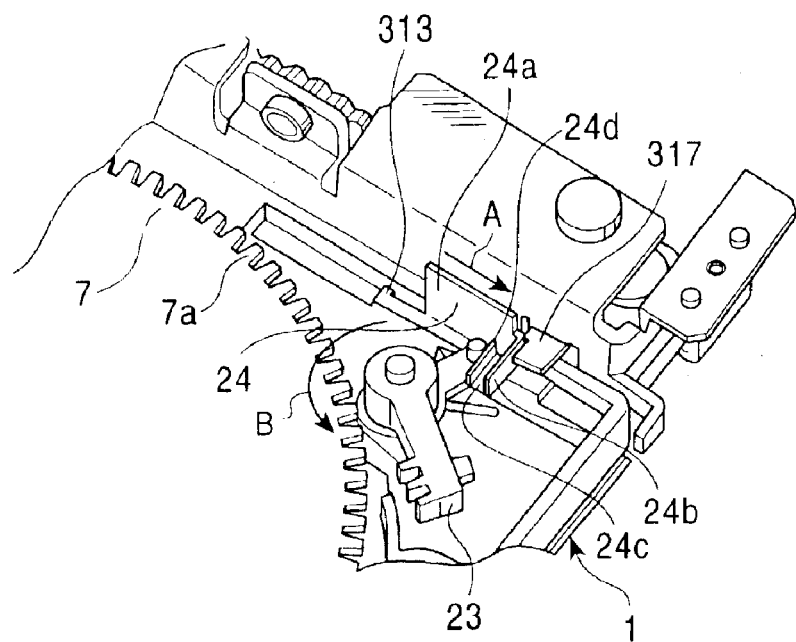
FIG. 26 is a perspective view showing a shutter member and a reel lock of the tape cartridge.

As shown in FIG. 26, the reel lock 23, which becomes engaged with an engaging portion 7a formed on the flange 7 of the tape reel 6 and prevents the tape reel 6 from rotating freely, is disposed at a position near the reel lock disengaging member receiving groove 120.

In addition, the reel lock disengaging member receiving groove 120 is closed by the shutter 24, which is disposed inside the cartridge housing 2 and prevents the interior of the cartridge housing 2 from facing outside.

When the tape cartridge 1 is inserted in the recording/playback apparatus, the reel lock disengaging member 317 is inserted into the reel lock disengaging member receiving groove 120, presses the shutter 24 and the reel lock 23, and thereby releases the tape reel 6 from the lock.

Figure 27:
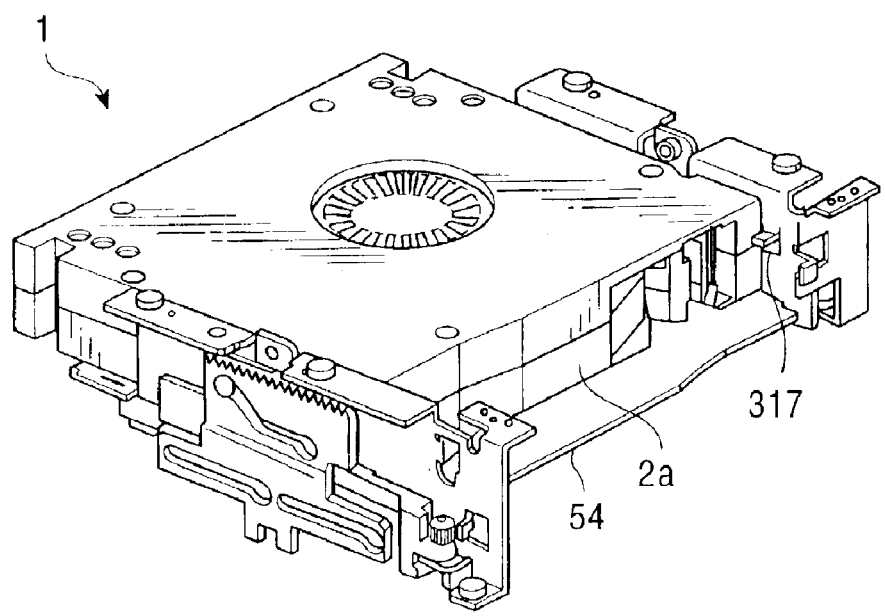
FIG. 27 is a perspective view showing a state in which the tape cartridge according to the present invention is improperly inserted into the recording/playback apparatus.

The reel lock disengaging member receiving groove 120 is formed in one of the upper-half member 3 and the lower-half member 4, so that it is displaced upward or downward from the center of the cartridge housing 2 in the thickness direction thereof. Accordingly, as shown in FIG. 27, when the tape cartridge 1 is inserted inversely into the recording/playback apparatus, the reel lock disengaging member 317, which is disposed inside the recording/playback apparatus in accordance with the reel lock disengaging member receiving groove 120, contacts the outside wall 2a of the cartridge housing 2 and prevents the tape cartridge 1 from being carried to the loading position.

As shown in FIG. 26, the shutter 24, which is disposed inside the reel lock disengaging member receiving groove 120 and prevents dust from entering the cartridge housing 2, includes a shutter member 24a which is formed in the plate-like shape and which prevents dust from entering, a first pressing member 24b which is formed at one end of the shutter member 24a and which is pressed by the reel lock disengaging member 317, and a second pressing member 24d which is connected to the first pressing member 24b by a connecting member 24c and which presses the reel lock 23.

As shown in FIG. 26, the shutter 24 is supported by a shutter guide groove 313 in a movable manner, the shutter guide groove 313 being formed along the side wall 2b in accordance with the reel lock disengaging member receiving groove 120 formed in the upper-half member 3 or the lower-half member 4. As shown in FIG. 24, the shutter 24 is supported by the shutter guide groove 313 in such a manner that the shutter member 24a is disposed along the side wall 2b in the shutter receiving hole 120a, and the first pressing member 24b is disposed along the side wall 2a, which is at the front side in the direction in which the tape cartridge 1 is inserted into the recording/playback apparatus, in the shutter receiving hole 120a. Accordingly, the shutter receiving 120a of the reel lock disengaging member receiving groove 120 is blocked and the cartridge housing 2 is closed.

The second pressing member 24d of the shutter 24 is in contact with a pressing shaft of the reel lock 23 and is continuously pressed in the direction in which the shutter 24 closes the cartridge housing 2, that is, in the direction shown by the arrow A in FIG. 26, by a pressing force applied to the reel lock 23 by a torsion spring.

In addition, the when the tape cartridge 1 is inserted in the recording/playback apparatus, the reel lock disengaging member 317 disposed inside the recording/playback apparatus is inserted into the reel lock disengaging member receiving groove 120 and presses the first pressing member 24b of shutter 24. Thus, the shutter 24 is pressed in the direction opposite to the direction shown by the arrow A in FIG. 26 against the pressing force applied to the reel lock 23 by the torsion spring. Accordingly, the pressing shaft of the reel lock 23, which is in contact with the second pressing member 24d, is pressed in the direction in which the tape reel is released, that is, in the direction opposite to the direction shown by the arrow A in FIG. 26.

When the tape cartridge 1 is ejected from the recording/playback apparatus, the second pressing member 24d, which is in contact with the pressing shaft, is pressed in the direction shown by the arrow A by the pressing force applied to the reel lock 23 by the torsion spring. Accordingly, the shutter 24 closes the reel lock disengaging member receiving groove 120 of the cartridge housing 2.

As described above, the shutter 24 always closes the cartridge housing 2 when the tape cartridge 1 is not loaded in the recording/playback apparatus. Accordingly, dust is prevented from entering the cartridge housing 2 and damaging the tape-like recording medium 10, and degradation of the recording/playback characteristics of the tape-like recording medium 9 is prevented.

In the tape cartridge and the recording/playback apparatus according to the present invention which are constructed as described above, a restraining recess or a restraining projection is formed on the upper surface thereof of the leader block, and a positioning groove or a positioning projection is formed at the lower surface thereof. In addition, a restraining projection or a restraining recess and a positioning projection or a positioning groove are formed in the take-up reel disposed in the apparatus.

Accordingly, when the leader block is inserted in the take-up reel, the positioning projection or the positioning groove formed in the take-up reel guides the insertion of the leader block into the take-up reel and positions the leader block inside the take-up reel. In addition, the leader block is restrained by the restraining projection or the restraining recess formed in the take-up reel. Accordingly, the leader block is pressed by the second restraining projection, so that rattling of the leader block in the take-up reel is prevented.

In addition, a second restraining recess or a second restraining projection is formed on the upper surface of the leader block and a second positioning groove or a second positioning projection is formed at the lower surface of the leader block. In addition, a restraining projection or a restraining recess and a positioning projection or a positioning groove are formed in the cartridge housing. Accordingly, when the leader block is retracted into the cartridge, the positioning projection or the positioning groove formed in the cartridge-housing guides the insertion of the leader block into the cartridge housing and positions the leader block inside the cartridge housing. In addition, the leader block is restrained by the restraining projection or the restraining recess formed in the cartridge housing. Accordingly, the leader block is pressed by the restraining projection or the restraining recess, so that rattling of the leader block in the cartridge housing is prevented.

In addition, the single-reel tape cartridge according to the present invention, a pair of changer grips which extend from end to end of the cartridge housing in the vertical direction are formed at two corners selected from three corners of the cartridge housing excluding a corner at which the tape-passage hole is formed. If the single-reel tape cartridge is used in a library apparatus or the like, is can be carried between a magazine and a tray used for transferring the tape cartridge and between the tray and a magnetic recording/playback apparatus even when hand arms mounted on the tray do not have opening/closing function. Accordingly, the construction and the control circuit for the hand arm are simplified and costs required for the library apparatus are largely reduced.

A memory module, which stores management information for the tape-like recording medium and which is used for radio communication, is installed in the cartridge housing and is disposed at an angle in one of the corners of the cartridge housing so that a radio-communication antenna of the memory module faces at least two directions. In addition, one of the changer grips is placed in a triangular space surrounded by the memory module and two side surfaces of the cartridge housing. Thus, the management information for the recording medium stored in the memory module can be accessed selectively from at least two directions, and there is more freedom in choosing the position to dispose the memory-access module used for accessing the memory module. Accordingly, even when an information recording/playback apparatus, such as the magnetic recording/playback apparatus, is of the type in which the rear surface of an information-storing cartridge projects outside while the tape cartridge is loaded, the memory module can be accessed by the memory-access module. As a result, there is more freedom in designing the information recording/playback apparatus.

Since one of the changer grips is disposed by effectively using the triangular space surrounded by the memory module and two side surfaces of the tape cartridge, the size of the tape cartridge can be prevented from being increased due to the installation of the changer grip and the memory module.

In addition, in the tape cartridge and the recording/playback apparatus according to the present invention, at least one of a first end of the tape-like recording medium placed near the center of the tape reel and a second end of the tape-like recording medium placed at the periphery of the tape reel is provided with a leader tape portion and a striped portion used for identifying the medium, and the tape-like recording medium is extracted from the cartridge housing from the second end thereof when the tape-like recording medium is subjected to an information signal recording/playback operation. Even when the management information and medium identifying information for the tape-like recording medium are stored in a memory unit installed in the cartridge housing, there may be a case in which the tape cartridge cannot be identified on the basis of the medium identifying information due to malfunction of the memory unit, etc. However, even in such a case, the kind of the tape-like recording medium is identified without degrading the compatibility with a known tape streamer drive by detecting the striped portion. Accordingly, parameters necessary for the recording/playback operation are set in accordance with the kind of the tape-like recording media.

Accordingly, the present invention provides a tape cartridge having a single reel and a recording/playback apparatus using the tape cartridge in which the kind of the tape-like recording medium is identified without degrading the compatibility with a known tape streamer drive so that parameters necessary for the recording/playback operation are set in accordance with the kind of the recording media, and in which the end of the tape-like recording medium can be reliably detected.

In addition, the tape-cartridge in which the present invention is applied includes a shutter which is in contact with the reel lock and which disengages the reel lock from the tape reel by being pressed by a reel lock disengaging member disposed inside the drive apparatus. Accordingly, when the tape cartridge is not used, the shutter closes the reel lock disengaging member receiving groove by being pressed by the reel lock, so that dust is prevented from entering the cartridge housing.

In addition, the reel lock disengaging member receiving groove is formed at a position displaced from the center of the cartridge housing in the thickness direction thereof. Accordingly, even when the tape cartridge is inserted into the drive apparatus inversely by accident, the reel lock disengaging member does not enter the reel lock disengaging member receiving groove and the drive apparatus do not allow the tape cartridge to be loaded therein. Accordingly, it is easily determined that the tape cartridge is inserted improperly and the tape cartridge is prevented from being improperly loaded into the drive apparatus.

What is claimed is:

1. A single-reel tape cartridge comprising one tape reel and a tape-like recording medium wound around a periphery of the tape reel, the tape reel and the tape-like recording medium being contained inside a cartridge housing so that an outer end of the tape-like recording medium is extracted from the cartridge housing through a tape-passage hole formed in the cartridge housing, wherein a leader block is connected to the outer end of the tape-like recording medium placed at the periphery of the tape reel, and wherein the leader block has one of a positioning groove and a positioning projection used for guiding and positioning the leader block when the leader block is inserted into a take-up reel that winds the tape-like recording medium and has one of a restraining recess and a restraining projection used for positioning the leader block in the take-up reel, wherein one of the positioning groove and the positioning projection provided in the leader block is formed such that an end thereof has a V shape, wherein the leader block is further provided with one of a second positioning groove and a second positioning projection used for guiding and positioning the leader block when the leader block is inserted into the cartridge housing, and one of a second restraining recess and a second restraining projection used for positioning the leader block in the cartridge housing, and wherein an opening formed in the cartridge housing is provided with one of a positioning projection and a positioning groove which becomes engaged with one of the second positioning groove and the second positioning projection provided in the leader block so as to guide and position the leader block when the leader block is inserted into the cartridge housing, and one of a restraining projection and a restraining recess which becomes engaged with one of the second restraining recess and the second restraining projection provided in the leader block so as to position the leader block in the cartridge housing.

2. The single-reel tape cartridge according to claim 1, wherein one of the second positioning groove and the second positioning projection provided in the leader block is formed such that an end thereof has a V shape, and one of the positioning projection and the positioning groove provided in the opening of the cartridge housing is formed such that an end thereof has a V shape corresponding to the shape of one of the second positioning groove and the second positioning projection provided in the leader block.

3. A single-reel tape cartridge comprising one tape reel and a tape-like recording medium wound around a periphery of the tape reel, the tape reel and the tape-like recording medium being contained inside a cartridge housing so that an outer end of the tape-like recording medium is extracted from the cartridge housing through a tape-passage hole formed in the cartridge housing, wherein a pair of changer grips extend from end to end of the cartridge housing in a vertical direction and are formed at two corners selected from three corners of the cartridge housing excluding a corner at which the tape-passage hole is formed, wherein a memory module used for radio communication is installed in the cartridge housing for storing management information for the tape-like recording medium, wherein the memory module for radio communication is disposed at an angle in one of the corners of the cartridge housing so that a radio-communication antenna of the memory module faces at least two directions, and wherein one of the pair of changer grips is placed in a triangular space surrounded by the memory module and two side surfaces of the cartridge housing.

4. A single-reel tape cartridge comprising one tape reel and a tape-like recording medium wound around a periphery of the tape reel, the tape reel and the tape-like recording medium being contained inside a cartridge housing so that an outer end of the tape-like recording medium is extracted from the cartridge housing through a tape-passage hole formed in the cartridge housing, wherein at least one of a first end of the tape-like recording medium placed near a center of the tape reel and a second end of the tape-like recording medium placed at the periphery of the tape reel is provided with a leader tape portion and a striped portion used for identifying the tape-like recording medium, wherein the tape-like recording medium is extracted from the cartridge housing from the second end thereof when the tape-like recording medium is subjected to an information signal recording/playback operation, wherein the first end of the tape-like recording medium placed near the center of the tape reel is fixed to the tape reel, and the tape-like recording medium is extracted from the cartridge housing from the second end of the tape-like recording medium placed at the periphery of the tape reel when the tape-like recording medium is subjected to the information signal recording/playback operation, and wherein a memory module used for radio communication is installed in the cartridge housing for storing management information for the tape-like recording medium.

5. A single-reel tape cartridge comprising one tape reel and a tape-like recording medium wound around a periphery of the tape reel, the tape reel and the tape-like recording medium being contained inside a cartridge housing so that an outer end of the tape-like recording medium is extracted from the cartridge housing through a tape-passage hole formed in the cartridge housing, wherein the tape reel includes a flange provided with an engaging member at a periphery of the flange, and wherein the single-reel tape cartridge is provided with a reel lock member which becomes engaged with the engaging member of the flange and thereby prevents the tape reel from rotating, a reel lock disengaging member receiving groove formed in at least one side of the cartridge housing which is parallel to a direction in which the tape cartridge is inserted into a drive apparatus, which is open at a front side in the direction in which the tape cartridge is inserted into the drive apparatus, and which receives a reel lock disengaging member which disengages the reel lock from the flange, and a shutter which closes the reel lock disengaging member receiving groove, which is in contact with the reel lock, and which disengages the reel lock from the flange by being pressed by the reel lock disengaging member.

6. The single-reel tape cartridge according to claim 5, wherein the reel lock disengaging member receiving groove is formed at a position displaced from a center of the cartridge housing in a thickness direction thereof.

7. A recording/playback apparatus which performs a recording/playback operation by using a single-reel tape cartridge comprising one tape reel and a tape-like recording medium wound around a periphery of the tape reel, the tape reel and the tape-like recording medium being contained inside a cartridge housing so that an outer end of the tape-like recording medium is extracted from the cartridge housing through a tape-passage hole formed in the cartridge housing, the recording/playback apparatus comprising: a cartridge-receiving member into which the tape cartridge is inserted;

a tape-extracting member having an engaging shaft which becomes engaged with an engaging member of a leader block attached to an end of the tape-like recording medium;

a take-up mechanism which winds the tape-like recording medium extracted by the tape-extracting member; and a transferring mechanism which transfers the tape-extracting member between the tape cartridge installed in the cartridge-receiving member and the take-up mechanism, wherein the take-up mechanism is provided with one of a positioning projection and a positioning groove which becomes engaged with one of a positioning groove and a positioning projection provided in the leader block so as to guide and position the leader block when the leader block is inserted into the take-up mechanism, and one of a restraining projection and a restraining recess which becomes engaged with one of a restraining recess and a restraining projection provided in the leader block so as to position the leader block in the take-up mechanism.

8. The recording/playback apparatus according to claim 7, wherein of the positioning projection and the positioning groove provided in the take-up mechanism of the recording/playback apparatus is formed such that an end thereof has a V shape corresponding to a shape of one of the positioning groove and the positioning projection provided in the leader block.

9. A recording/playback apparatus which performs a recording/playback operation by using a single-reel tape cartridge comprising one tape reel and a tape-like recording medium wound around a periphery of the tape reel, the tape reel and the tape-like recording medium being contained inside a cartridge housing so that an outer end of the tape-like recording medium is extracted from the cartridge housing through a tape-passage hole formed in the cartridge housing, wherein a pair of changer grips extend from end to end of the cartridge housing in a vertical direction and are formed at two corners selected form three corners of the cartridge housing excluding a corner at which the tape-passage hole is formed, wherein the memory module used for radio communication is installed in the cartridge housing, the memory module storing management information for the tape-like recording medium, wherein the memory module for radio communication is disposed at an angle in one of the corners of the cartridge housing so that a radio communication antenna of the memory module faces at least two directions, and wherein one of the pair of changers grips is placed in a triangular space surrounding by the memory module and two side surfaces of the cartridge housing.

10. A recording/playback apparatus which performs a recording/playback operation by using a single-reel tape cartridge comprising one tape reel and a tape-like recording medium wound around a periphery of the tape reel, the tape reel and the tape-like recording medium being contained inside a cartridge housing so that an outer end of the tape-like recording medium is extracted from the cartridge housing through a tape-passage hole formed in the cartridge housing, wherein at least one of a first end of the tape-like recording medium placed near the center of the tape reel and a second end of the tape-like recording medium placed at the periphery of the tape reel is provided with a leader tape portion and a striped portion used for identifying the tape-like recording medium, and wherein the tape-like recording medium is extracted from the cartridge housing from the second end thereof when the tape-like recording medium is subjected to an information signal recording/playback operation, the recording/playback apparatus comprising:

leader tape portion detecting means for detecting the leader tape portion at the first end of the tape-like recording medium; and control means for controlling an operation of extracting the tape-like recording medium from the cartridge housing, wherein the control means stops extraction of the tape-like recording medium from the cartridge housing when the leader tape portion at the first end of the tape-like recording medium is detected by the leader tape portion detecting means.

11. The recording/playback apparatus according to claim 10, further comprising:

striped-portion detecting means for detecting the striped portion formed on the leader tape portion at the second end of the tape-like recording medium; and control means for identifying the tape cartridge, wherein the control means identifies the tape cartridge based on a detection result of the striped portion formed on the leader tape portion at the second end of the tape-like recording medium obtained by the striped-portion detecting means.

12. The recording/playback apparatus according to claim 11 wherein a memory module used for radio communication is installed in the cartridge housing, the memory module storing management information for the tape-like recording medium, the recording/playback apparatus further comprising:

information reading means for reading medium identifying information, which is the management information, from the memory module, wherein the control means identifies the tape cartridge based on medium identifying information read out from the memory module by the information reading means, and when the tape cartridge cannot be identified by the medium identifying information, identifies the tape cartridge on the basis of the detection result of the striped portion formed on the leader tape portion at the second end of the tape-like recording medium obtained by the striped-portion detecting means.

13. A recording/playback apparatus according to claim 12 wherein one or more medium identifying holes are formed in the cartridge housing, the recording/playback apparatus further comprising:

medium-identifying-hole detecting means for detecting the medium identifying holes formed in the cartridge housing, and wherein the control means identifies the tape cartridge on the basis of the medium identifying information read out from the memory module by the information reading means, and when the tape cartridge cannot be identified by the medium identifying information, identifies the tape cartridge on the basis of a detection result of the medium identifying holes obtained by the medium-identifying-hole detecting means, and when the tape cartridge cannot be identified by the detection result of the medium identifying holes, identifies the tape cartridge on the basis of the detection result of the striped portion formed on the leader tape portion at the second end of the tape-like recording medium obtained by the striped-portion detecting means.

14. A recording/playback apparatus which performs a recording/playback operation by using a single-reel tape cartridge comprising one tape reel and a tape-like recording medium wound around a periphery of the tape reel, the tape reel and the tape-like recording medium being contained inside a cartridge housing so that an outer end of the tape-like recording medium is extracted from the cartridge housing through a tape-passage hole formed in the cartridge housing, wherein the single-reel tape cartridge is provided with a reel lock which becomes engaged with an engaging member of the flange and thereby prevents the tape reel from rotating; a reel lock disengaging member receiving groove which is formed at least one side of the cartridge housing which is parallel to the direction in which the tape cartridge is inserted into a drive apparatus, which is open at the front side in the direction in which the tape cartridge is inserted into the drive apparatus, and which receives a reel lock disengaging member which disengages the reel lock from the flange; and a shutter which closes the reel lock disengaging member receiving groove, which is in contact with the reel lock, and which disengages the reel lock from the flange by being pressed by the reel lock disengaging member, and wherein the recording/playback apparatus is provided with a cartridge-receiving member in which the tape cartridge is inserted and the reel lock disengaging member which is formed in the cartridge-receiving member.

15. The recording/playback apparatus according to claim 14, wherein the reel lock disengaging member receiving groove is formed at a position displaced from a center of the cartridge housing in a thickness direction thereof.

* * * * *